United States Patent
Brown et al.

(10) Patent No.: US 11,815,410 B2
(45) Date of Patent: Nov. 14, 2023

(54) PLATINUM RESISTANCE TEMPERATURE SENSOR HAVING FLOATING PLATINUM MEMBER

(71) Applicant: Fluke Corporation, Everett, WA (US)

(72) Inventors: Timothy B. Brown, Everett, WA (US); Rong Ding, Lindon, UT (US); Donald D. Leach, Shoreline, WA (US); David W. Farley, Orem, UT (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 17/825,752

(22) Filed: May 26, 2022

(65) Prior Publication Data
US 2022/0283039 A1    Sep. 8, 2022

Related U.S. Application Data

(62) Division of application No. 16/457,476, filed on Jun. 28, 2019, now Pat. No. 11,371,892.

(51) Int. Cl.
*G01K 7/18*     (2006.01)
*G01K 1/14*     (2021.01)
(Continued)

(52) U.S. Cl.
CPC ............. *G01K 7/18* (2013.01); *G01K 1/08* (2013.01); *G01K 1/14* (2013.01); *G01K 7/183* (2013.01); *G01K 1/10* (2013.01)

(58) Field of Classification Search
CPC .. G01K 7/18; G01K 1/08; G01K 1/14; G01K 7/183; G01K 1/10
See application file for complete search history.

(56) References Cited

U.S. PATENT DOCUMENTS 2,780,703 A * 2/1957 Macintyre ................ G01K 7/18
                                                    338/274
3,781,749 A * 12/1973 Iles ........................ G01K 7/183
                                                    427/102
(Continued)

FOREIGN PATENT DOCUMENTS

GB           2 167 603 A       5/1986

OTHER PUBLICATIONS

Wikipedia, "Resistance thermometer", https://web.archive.org/web20190412082014/https://en.wikipedia.org/wiki/Resistance_thermometer, dated Mar. 12, 2019, downloaded Jun. 11, 2020, 11 pages.

(Continued)

*Primary Examiner* — Nathaniel T Woodward
*Assistant Examiner* — Philip L Cotey
(74) *Attorney, Agent, or Firm* — SEED INTELLECTUAL PROPERTY LAW GROUP LLP

(57) ABSTRACT

A temperature sensor includes a main body having a peripheral surface that extends along an axis between ends of the main body. A plurality of support structures are arranged along the main body and project from the peripheral surface of the main body transversely to the axis. A sleeve has a cavity defined by one or more sidewalls extending between first and second ends. The main body of the temperature sensor is positioned within the cavity. A platinum member having a length that extends along the main body is supported by a set of support structures of the plurality of support structures. In some cases, a seal member extends between the one or more sidewalls at the first end of the sleeve and seals the main body and the platinum member within the cavity. Measurement terminals may extend from the platinum member to an exterior of the temperature sensor.

20 Claims, 14 Drawing Sheets

(51) Int. Cl.
*G01K 1/08* (2021.01)
*G01K 1/10* (2006.01)

(56) References Cited

U.S. PATENT DOCUMENTS

| | | | | |
|---|---|---|---|---|
| 4,010,351 | A * | 3/1977 | Williams | G01K 7/08 |
| | | | | 374/E7.011 |
| 4,882,571 | A * | 11/1989 | Hori | G01N 27/18 |
| | | | | 338/28 |
| 5,831,512 | A * | 11/1998 | Wienand | G01K 7/183 |
| | | | | 338/22 SD |
| 6,127,915 | A * | 10/2000 | Gam | G01K 1/12 |
| | | | | 374/185 |
| 9,513,242 | B2 * | 12/2016 | Beck | G01N 27/225 |
| 9,696,270 | B1 * | 7/2017 | Roy | G01N 25/18 |
| 10,782,190 | B1 * | 9/2020 | Gregory | C04B 41/4515 |
| 2001/0000298 | A1 * | 4/2001 | Wienand | G01K 7/183 |
| | | | | 374/E7.022 |
| 2002/0136263 | A1 * | 9/2002 | Wilkins | G01K 1/14 |
| | | | | 374/185 |
| 2002/0179992 | A1 * | 12/2002 | Parsons | H01C 7/022 |
| | | | | 257/469 |
| 2005/0200448 | A1 * | 9/2005 | Fujita | G01K 13/02 |
| | | | | 338/25 |
| 2006/0237438 | A1 * | 10/2006 | Wilkins | H05B 3/746 |
| | | | | 219/505 |
| 2008/0304544 | A1 * | 12/2008 | Kvisteroy | G01L 21/00 |
| | | | | 374/143 |
| 2010/0078753 | A1 * | 4/2010 | Mehregany | G01F 1/6845 |
| | | | | 438/54 |
| 2010/0150204 | A1 * | 6/2010 | Yamaguchi | G01K 1/10 |
| | | | | 374/100 |
| 2011/0129934 | A1 * | 6/2011 | Agnew | G01K 7/183 |
| | | | | 436/84 |
| 2011/0235678 | A1 * | 9/2011 | Kurtz | G01K 7/183 |
| | | | | 374/185 |
| 2014/0192840 | A1 * | 7/2014 | Sun | G01K 1/12 |
| | | | | 374/208 |
| 2014/0247106 | A1 * | 9/2014 | DeFrietas | G01K 13/02 |
| | | | | 338/25 |
| 2015/0075280 | A1 * | 3/2015 | Hultmark | G01N 27/121 |
| | | | | 29/612 |
| 2016/0320251 | A1 * | 11/2016 | Kieffer | G01K 7/18 |
| 2017/0138799 | A1 * | 5/2017 | Arwatz | G01K 1/18 |
| 2017/0191879 | A1 * | 7/2017 | Martin | G01K 7/223 |
| 2018/0356357 | A1 * | 12/2018 | Samarao | G01N 27/128 |

OTHER PUBLICATIONS

Patron Corporation, "Elements for RTD", www.patroncorporation.com/elements-for-rtd.html, © 2018, downloaded Jun. 11, 2020, 7 pages.

Extended European Search Report for EP 20182590.8 dated Nov. 12, 2020, 5 pages.

* cited by examiner

PLATINUM RESISTANCE TEMPERATURE SENSOR HAVING FLOATING PLATINUM MEMBER

BACKGROUND

Technical Field

The present disclosure relates to temperature sensor devices and, more particularly, temperature sensor devices that include a platinum resistance element.

Description of the Related Art

Platinum resistance temperature sensors are preferred in numerous academic and industrial applications because they are among the most accurate temperature measurement devices available. FIG. 1 shows a previously-implemented platinum resistance temperature sensor 100 that includes a platinum wire 102 wrapped around a spacer 104 made of ceramic, glass, etc. The platinum wire 102 and the spacer 104 are typically placed in a sheath 106 and an interior 108 of the sheath 106 is vacuum sealed or filled with an inert material. The resistance of the platinum wire 102 is measured across a pair of leads 110 that are electrically connected to the platinum wire. Although platinum resistance temperature sensors 100 are highly accurate, they are also highly sensitive to impact or vibration. As a result of an impact, for example, the platinum in the platinum resistance temperature sensors 100 may have to be annealed and a system measuring the resistance of the platinum wire 102 at the leads 110 may have to be recalibrated. The sensitivity of platinum resistance temperature sensors 100 to impact and vibration limits their applicability.

The wire-wound platinum resistance temperature sensor 100 has other deficiencies as well. Metals and elements of relatively smaller size (e.g., Na, K, Mg) may diffuse through the sheath 106 and contaminate the sensor 100. The cost and labor of manufacturing the platinum resistance temperature sensor 100 is also high and can be difficult to manufacture in large quantities due to its sensitivity.

FIG. 2 shows another known platinum resistance temperature sensor 200 that is less sensitive to impact and vibration than the platinum resistance temperature sensor 100. The platinum resistance temperature sensor 200 includes a platinum thin-film layer 202 deposited (e.g., via sputtering) onto a non-platinum substrate 204. The platinum thin-film layer 202 is secured to the substrate 204 against a glass layer 206. Connection pads 208 of a set of wires 210 are electrically and physically connected to leads 212 of the platinum thin-film layer 202 via apertures 214 in the glass layer 206. A layer 216 for strain relief and/or insulation may secure the connection of the connection pads 208 to the leads 212. Although more robust against vibration and impact than the platinum resistance temperature sensor 100, the platinum resistance temperature sensor 200 is less accurate than the platinum resistance temperature sensor 100 due at least in part to the difference in the coefficient of thermal expansion between the platinum thin-film layer 202 and the substrate 204, which causes error and hysteresis in temperature measurements made by the device. Moreover, because the platinum thin-film layer 202 is deposited on the substrate 204, stress in the platinum thin-film layer 202 may be inherent and annealing may not be possible.

The design of the platinum resistance temperature sensor 200 has several advantages over the platinum resistance temperature sensor 100. The platinum resistance temperature sensor 200 is more robust with regard to vibration and impact than the platinum resistance temperature sensor 100, and is less costly and easier to manufacture. Although it is possible to anneal the platinum resistance temperature sensor 200, the effects associated with strain and/or coefficients of thermal expansion may continue to cause hysteresis and error in the device. Annealing the platinum resistance temperature sensor 200 thus does not necessarily improve performance of the platinum resistance temperature sensor 200. Moreover, the platinum resistance temperature sensor 100 has better accuracy and a greater temperature range than the platinum resistance temperature sensor 200.

Design and manufacture of a platinum resistance temperature sensor having high accuracy characteristics and temperature range such as provided by the platinum resistance temperature sensor 100 and having the robustness of the platinum resistance temperature sensor 200 has presented a difficult challenge those skilled in the art. Further, those skilled in the art have been unable to design a platinum resistance temperature sensor that, in combination with the foregoing properties, is also relatively inexpensive and easy to produce in large quantities.

BRIEF SUMMARY

Embodiments of a platinum resistance temperature sensor disclosed herein have a first substrate provided with a first support surface and a second support surface, a platinum member having a set of prongs extending from a base portion, and a first post extending from the first support surface. The base portion of the platinum member is positioned on the first support surface and the first post restricts movement of the base portion relative to the first support surface. The set of prongs extend from the base portion to the second support surface and are suspended over an upper surface of the first substrate.

In some embodiments, the platinum resistance temperature sensor includes a second substrate having a lower surface opposing the upper surface of the first substrate and enclosing the platinum member within the platinum resistance temperature sensor. The lower surface of the second substrate may be adjacent to ends of the set of prongs and the lower surface may be adjacent to an upper surface of the base portion. The ends of the set of prongs may be in contact with and supported by the second support surface. The base portion of the platinum member may have a receiving portion into which the post extends and the receiving portion may have a size and shape to permit the base portion to move relative to the first support surface. In some embodiments, the platinum resistance temperature sensor may include support structures that limit deflection of the set of prongs.

In some embodiments, the platinum resistance temperature sensor may have a main body having a peripheral surface extending along an axis between ends of the main body. A platinum member of the platinum resistance temperature sensor may have a length extending along the main body and be supported by a set of support structures arranged along the main body. The set of support structures may project transversely from the peripheral surface. The platinum resistance temperature sensor may include a sleeve having a cavity defined by sidewalls extending between a first end and a second end. The main body may be enclosed within the cavity.

Beneficially, the platinum resistance temperature sensor disclosed herein is robust to vibration and/or impact, and is configured to facilitate temperature measurement with a high degree of accuracy. The platinum resistance temperature sensor is useable in high-end equipment. Further, the platinum resistance temperature sensor is low maintenance and can be used in settings where there may be long periods of time between calibrations. The platinum resistance temperature sensor may be configured to reduce the likelihood of contamination of the platinum member.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that may be associated with implementations of the present disclosure, including but not limited to measurement systems, have not been shown or described in order to avoid unnecessarily obscuring descriptions of the embodiments.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or", and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is comprised. For instance, a subset of a set of ten items will include less than ten items and at least one item.

Figure 1:
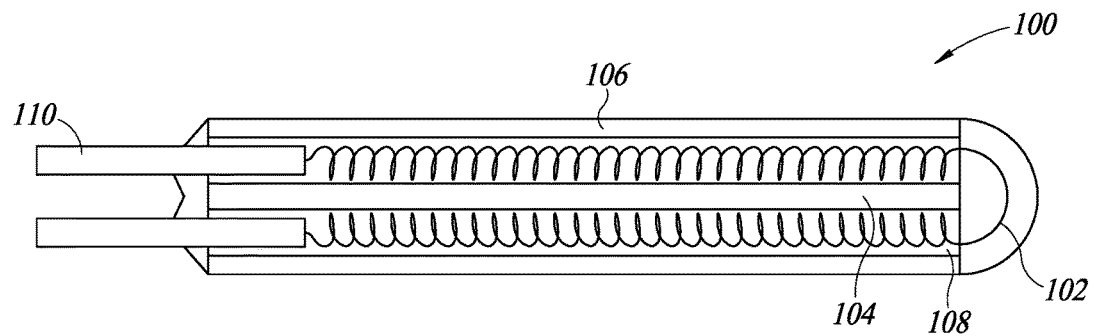
FIG. 1 shows a previously-implemented wire-wound platinum resistance temperature sensor.
Figure 2:
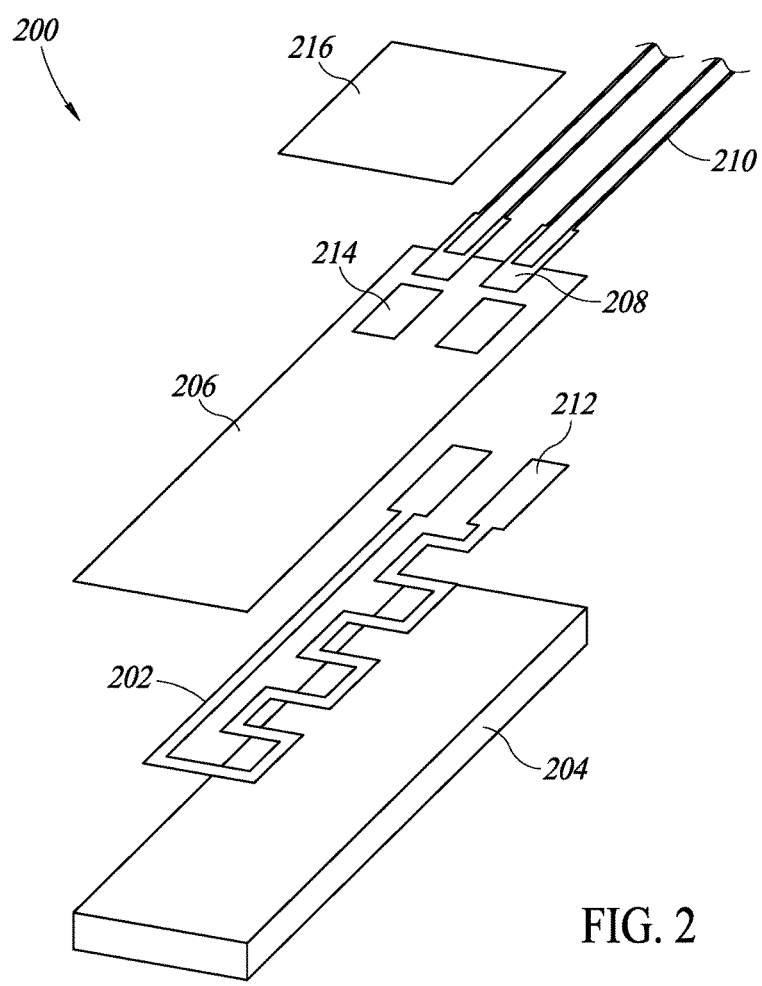
FIG. 2 shows a previously-implemented thin-film platinum resistance temperature sensor.
Figure 3:
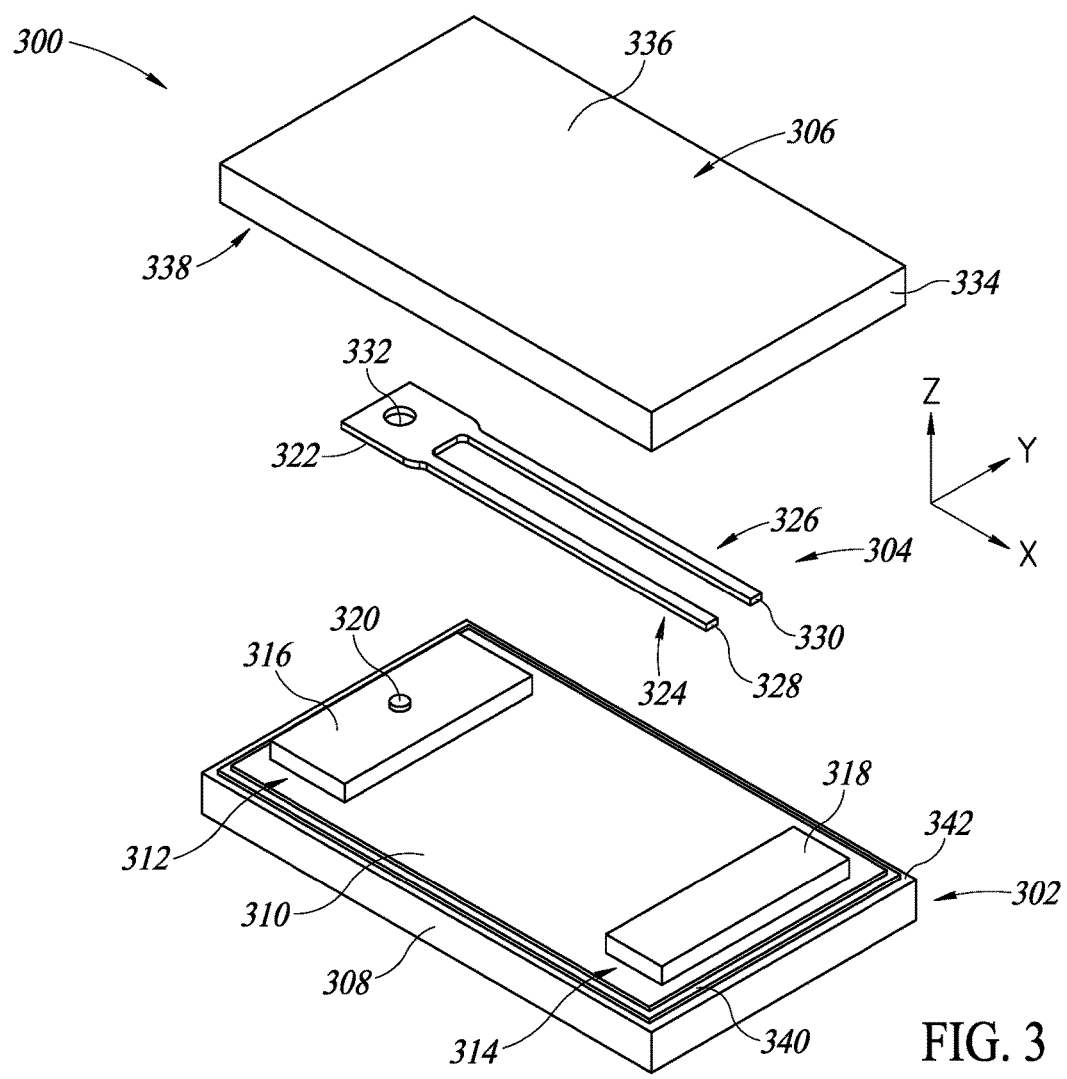
FIG. 3 shows an exploded view of a platinum resistance temperature sensor according to one or more embodiments.

FIG. 3 shows an exploded view of a platinum resistance temperature sensor 300 according to one or more embodiments of the present disclosure. The platinum resistance temperature sensor 300 includes a first substrate 302, a platinum member 304, and a second substrate 306. The first substrate 302 is formed of non-porous $Al_2O_3$, which is also known as aluminum oxide or alumina. The alumina forming the first substrate 302 may have a very high degree of purity, for example being equal to or greater than 99.96%. That is, the first substrate 302 may be formed of 99.96% pure $Al_2O_3$. The first substrate 302 shown in FIG. 3 has a body portion 308 with an upper surface 310. Alumina has a low permeability and subsequent release of metal ions than other materials currently used in platinum resistance temperature sensor applications, such as fused silica. Alumina may therefore be a material better suited for forming the first substrate 302.

The first substrate 302 has a first platform 312 projecting upwardly from the upper surface 310 near a first end of the body portion 308, and a second platform 314 projecting upwardly from the upper surface 310 at a second end of the body portion 308. The first platform 312 and the second platform 314 are spaced apart from each other along a length direction of the platinum resistance temperature sensor 300 (i.e., along the X-axis shown). In the illustrated embodiment, the first platform 312 has a rectangular cross-sectional shape in a horizontal plane (e.g., on a plane parallel with X-Y axes) with a first support surface 316 formed on an upper portion thereof. The second platform 314 also has a rectangular cross-sectional shape in the horizontal plane with a second support surface 318 formed on an upper portion thereof. In other embodiments, the first and second platforms 312, 314 may have a non-rectangular cross section. The first support surface 316 and the second support surface 318 may be coplanar with each other and be positioned above the upper surface 310.

The first substrate 302 may also include a first post 320 extending upwardly from the first support surface 316. The first post 320 in the embodiment depicted in FIG. 3 has a circular cross-sectional shape in the horizontal plane, but may have a different cross-sectional shape depending on the configuration of the platinum member 304.

The platinum member 304 is formed of platinum having a high degree of purity—for instance, equal to or greater than 99% platinum. In some applications, a purity of 99.99% platinum in the platinum member 304 may be desirable to achieve high levels of accuracy and precision. The platinum member 304 may be formed by laser ablation of a high-purity platinum foil, by deposition (e.g., sputtering onto a sacrificial portion of the first substrate 302), by ion milling, by focused ion beam milling, or by other suitable forming processes. The platinum member 304 has a base portion 322 with a length (i.e., along the x-axis) and a width (i.e., along the y-axis) sized to fit on and be supported by the first support surface 316. The base portion 322 of the platinum member 304 is thin (i.e., along the z-axis) relative to its length and width. The platinum member 304 has a first prong 324 and a second prong 326 extending in parallel (in this embodiment) in the length direction (i.e., in a direction parallel to the X-axis shown) from the base portion 322. The first prong 324 and the second prong 326 are spaced apart from each other in the width direction. The first prong 324 has a length terminating at an end portion 328 and the second prong 326 has a length terminating at an end portion 330. The first prong 324 and the second prong have respective lengths such that the end portions 328 and 330 can be in contact with and supported by the second support surface 318 when the base portion 322 is in contact with and supported by the first support surface 316, as described below with respect to FIG. 4 and elsewhere herein. The first prong 324 and the second prong 326 may be uniform in width and/or thickness along their respective lengths. The first prong 324 and the second prong 326 may have a width (i.e., along the Y-axis) equal to each other in at least some embodiments. The base portion 322 also has a receiving portion 332 sized and shaped to receive the first post 320.

The second substrate 306 is configured to engage with the body portion 308 of the first substrate 302 and enclose or encapsulate the platinum member 304 therein. The second substrate 306, as embodied in the platinum resistance temperature sensor 300, has sidewalls 334 extending downwardly from an upper portion 336 and forming a cavity 338 for receiving and enclosing the platinum member 304 between the upper portion 336 and the body portion 308.

The second substrate 306 may be attached to the body portion 308 of the first substrate 302 by a gasket or a seal 340 to encapsulate and seal the platinum member 304 in the cavity 338. The seal 340 is spaced apart from the platinum member 304, the first platform 312, and the second platform 314 to prevent contamination of the platinum member 304. The seal 340 may be glass, fused silica, or another material that is not subject to phase change at high temperatures (e.g., greater than 1000° C.).

Exposure to metal ions or $O_2$ may ruin the platinum member 304, which easily absorbs and is contaminated by the metal ions. In the platinum resistance temperature sensor 300, the platinum member 304 is spaced apart from the seal 340 to reduce the likelihood of contamination by metal ions. The material of the first substrate 302 (e.g., $Al_2O_3$) and/or the second substrate 306 has a lower permeability to metal ions than the fused silica or glass that may form the seal 340. The first substrate 302 and the second substrate 306 may therefore block or otherwise inhibit the transfer of metal ions, oxygen ($O_2$), and other matter that may be potentially deleterious to the temperature-dependent resistance of the platinum member 304. The first substrate 302 and/or the second substrate 306 may form a lip or raised barrier 342 preventing the seal 340 from contacting or being exposed to metal ions or other harmful matter external to the platinum resistance temperature sensor 300, thereby reducing or preventing such matter from being absorbed by the seal 340.

To assemble the platinum resistance temperature sensor 300 with the platinum member 304 housed therein, the seal 340 may be placed on the lower surface of the sidewalls 334 of the second substrate 306 or inward of the lip 342 of the first substrate 302. In some embodiments, the seal 340 may be placed in a liquid state. Then, the lower edge of the sidewalls 334 may be joined with the body portion 308 of the first substrate 302 and allowed to cool, transitioning the seal 340 from a liquid state to a solid state and affixing together the first and second substrates 302 and 306. When the platinum resistance temperature sensor 300 is sealed at a high temperature, such as a maximum rated temperature for the platinum resistance temperature sensor 300, the internal pressure therein is elevated and the risk of catastrophic failure of the platinum resistance temperature sensor 300 due to excessive pressure is reduced or eliminated.

Figure 4:
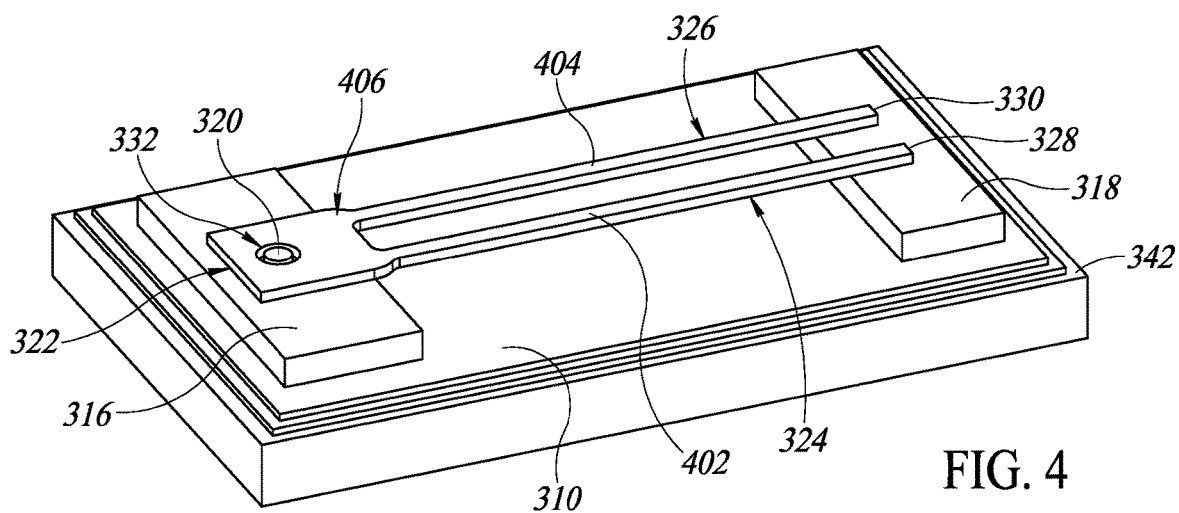
FIG. 4 shows an isometric view of a portion of the platinum resistance temperature sensor of FIG. 3.

FIG. 4 shows an isometric view of the platinum resistance temperature sensor 300 with the platinum member 304 positioned on the first substrate 302 according to one or more embodiments. The base portion 322 of the platinum member 304 is disposed on and supported by the first support surface 316 of the first platform 312. The first post 320 is positioned within sidewalls of the receiving portion 332 of the platinum member 304. The end portions 328 and 330 respectively of the first prong 324 and the second prong 326 are disposed on and supported by the second support surface 318 of the second platform 314. A medial portion 402 of the first prong 324 and a medial portion 404 of the second prong 326 are suspended over and spaced apart from the upper surface 310 of the first substrate 302. The base portion 322 of the platinum member 304 may include a first edge portion 406 that extends out from the first support surface 316 toward the second support surface 318 and that is suspended over the upper surface 310. The first edge portion 406 may be sized (e.g., with a width and/or thickness) to impart structural rigidity to the first prong 324 and the second prong 326, and thereby guard against strain on the platinum member 304 that may otherwise be caused by impacts to the platinum resistance temperature sensor 300.

The first substrate 302 and/or second substrate 306 may be aluminum oxide, or alumina, that is deposited, e.g., via sputtering an aluminum target in an oxygen environment, which may include inert gas such as argon. Photolithographic methods may be employed to generate the features of the first substrate 302 and/or the second substrate 306 described herein. Platinum foil having a very high purity may be applied to the first substrate 302 and photolithography and/or electrochemical milling may be used to shape and size the platinum foil as shown and described herein on the first substrate 302.

In some embodiments, a barrier layer (not shown) may be provided on the platinum member 304 and/or between the platinum member 304 and the first substrate 302 to help prevent diffusion into or from the platinum member 304. The barrier layer may have a coefficient of thermal expansion (CTE) similar to platinum so that changes in temperature will not affect the stresses and strain on the platinum member 304. The barrier layer may also impart additional structural strength to the platinum member and/or increase local conductivity, which may help to reduce or eliminate strain on the platinum member 304. The barrier layer may be sputtered on or otherwise deposited on the platinum member 304. The barrier layer does not necessarily coat an entire exterior surface of the platinum member 304, but may instead be applied on certain areas of the platinum member 304 (e.g., on a bottom surface of the base portion 322) or certain areas of the first substrate 302 or second substrate 306, such as on the first support surface 316 or the second support surface 318. As one example, a layer of $SiO_2$ or silicon dioxide can be deposited on surfaces to create spacers separating portions of platinum from the adjacent support structures.

In some embodiments, the platinum member 304 may be coated with a barrier layer using a material that has a similar CTE. The barrier layer coating the platinum member 304 may provide additional properties, such as added stiffness and/or protection against contamination. The barrier layer may be applied after attachment of a set of wires to the platinum member 304.

Figure 5A:
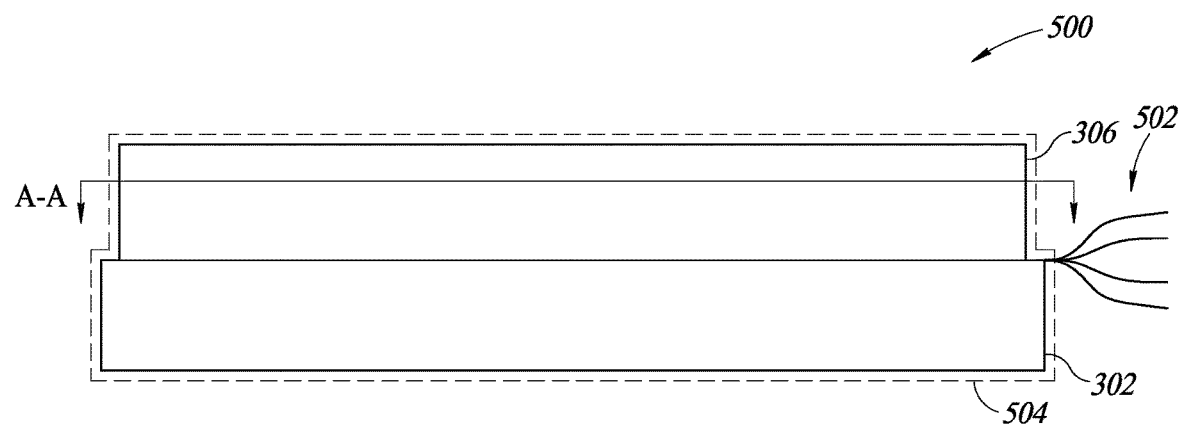
FIG. 5A shows a side view of a platinum temperature sensor according to one or more embodiments.
Figure 5B:
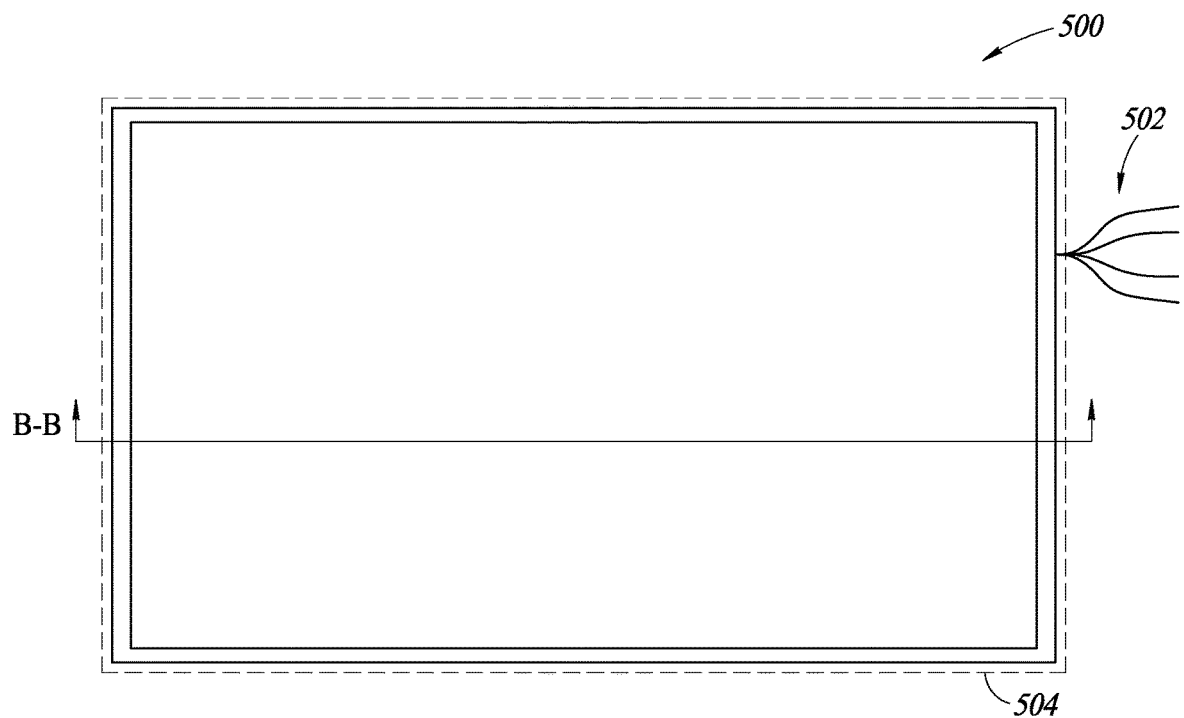
FIG. 5B shows a top plan view of a platinum temperature sensor according to one or more embodiments.

FIG. 5A shows a side view of an assembled platinum resistance temperature sensor 500 corresponding to the platinum resistance temperature sensor 300. FIG. 5B shows a top plan view of the assembled platinum resistance temperature sensor 500 according to one or more embodiments. The platinum resistance temperature sensor 500 includes the first substrate 302 attached to the second substrate 306 with the platinum member 304 encapsulated therein. The first substrate 302 and the second substrate 306 are attached to each other via the seal 340, as described elsewhere herein.

A set of wires 502 is electrically and physically connected to the platinum member 304 in the platinum resistance temperature sensor 500. The set of wires 502 extends from the interior of the platinum resistance temperature sensor 500, through the seal 340, and out to the exterior of the platinum resistance temperature sensor 500. The set of wires 502 may be connected to an electric circuit and/or a measurement device to measure the resistance of the platinum member 304 at the current temperature—for example, the set of wires 502 may be connected as a sensing arm of a Wheatstone bridge. In some embodiments, there may be four wires included in the set of wires 502 for performing four-terminal sensing measurements, also known as a Kelvin connection. In some embodiments, however, there may be exactly two wires in the set of wires 502. The number of wires in the set of wires 502 may depend on the number of platinum members included in the platinum resistance temperature sensor 500—for instance, four wires for each platinum member in the platinum resistance temperature sensor 500 for a total of eight wires in the set of wires 502.

In the drawings herein, the connection of the set of wires 502 is shown for illustrative purposes and is not intended to be limiting. In some of the accompanying figures, the set of wires 502 is omitted for clarity.

In some embodiments, an exterior surface of the platinum resistance temperature sensor 500 may be coated with a shell or barrier layer 504 for capturing contaminants that might otherwise migrate into the platinum resistance temperature sensor 500 and contaminate the platinum member 304. The barrier layer 504 may be platinum or another material that absorbs and/or retains contaminants that can migrate through the first substrate 302, the second substrate 306, or seams therebetween. The platinum resistance temperature sensor 500 may be coated with the barrier layer 504 after the first substrate 302 and the second substrate 306 are assembled with the platinum member 304 therein.

Figure 6:
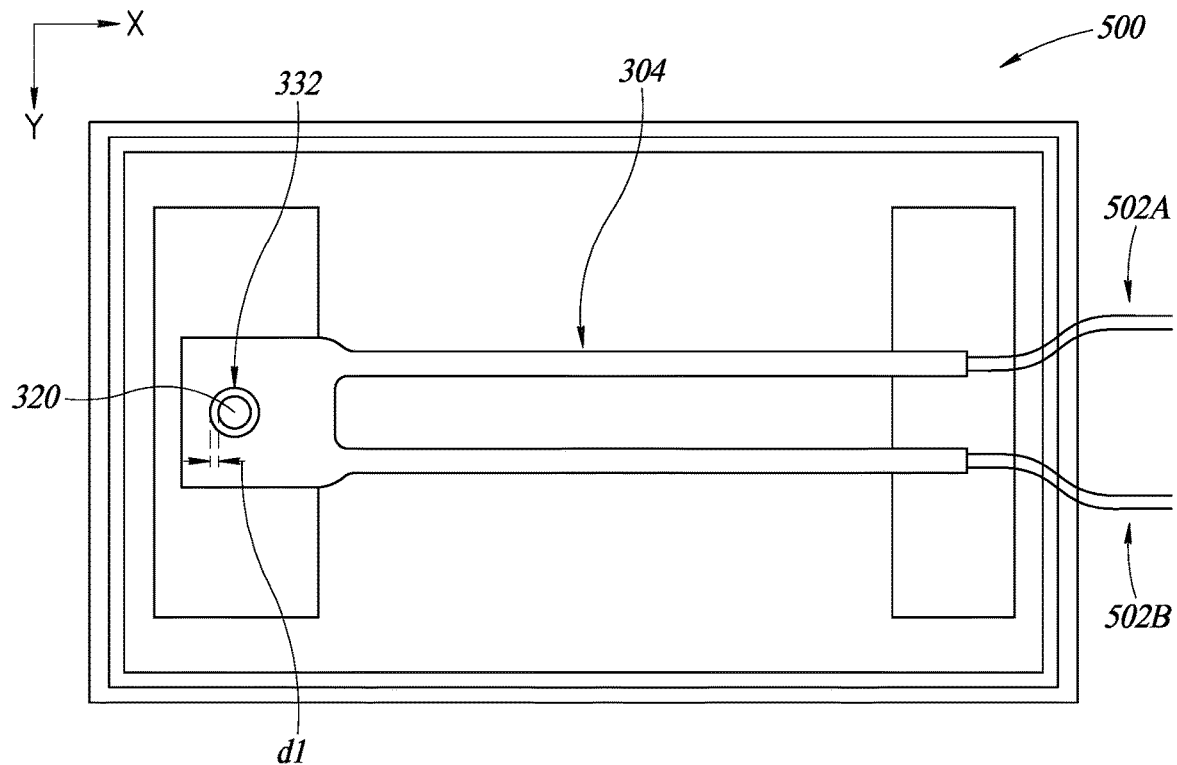
FIG. 6 shows a first cross-sectional top plan view of a platinum temperature sensor according to one or more embodiments.

FIG. 6 shows a cross-sectional top plan view of the platinum resistance temperature sensor 500 taken along the line A-A of FIG. 5A according to one or more embodiments. The platinum member 304 is positioned on the first substrate 304 with the base portion 322 on the first support surface 316 and the end portions 328 and 330 on the second support surface 318. The medial portions 402 and 404 of the first prong 324 and the second prong 326, respectively, span between the first platform 312 and the second platform 314. A first subset 502A of the set of wires 502 is attached to the end portion 328 of the first prong 324 and a second subset 502B of the set of wires 502 is attached to the end portion 330 of the second prong 326. The first subset 502A may include a single wire or a pair of wires and the second subset 502B may also include a single wire or a pair of wires, Platinum pads may be applied to connect or attach the first subset 502A to the end portion 328 and the second subset 502B to the end portion 330. The first subset 502A may be coupled to a point on the end portion 328 of the first prong 324 via a platinum pad. The second subset 502B may be coupled to a point on the end portion 330 of the second prong 326 via a platinum pad.

The first post 320 is received within the receiving portion 332, which has a shape corresponding to the first post 320 but which has a cross-sectional size in the horizontal plane that is greater than the cross-sectional size of the first post 320. For instance, the first post 320, in the cross-sectional view of FIG. 6, has a circular shape with a first cross-sectional area. The receiving portion 332, in the cross-sectional view of FIG. 6, has a circular shape with a second cross-sectional area that is greater than the first cross-sectional area. When the first post 320 and the receiving portion 332 are coaxially aligned with each other, the sides of the first post 320 are spaced apart at a distance from the sidewalls of the receiving portion 332. The distance d1 between the first post 320 and the receiving portion 332 may be, for example, 15 μm or greater. The distance d1 between the first post 320 and the receiving portion 332 allows for relative thermal expansion between the platinum member 304 and the first substrate 302 due to differences in CTEs of their respective materials. This also permits movement of the platinum member 304 relative to the first substrate 304. In some instances, the force exerted as a result of thermal expansion/contraction of the first post 320 against the sidewalls of the receiving portion 332 may cause strain induced error sufficient to invalidate calibration. As a result of providing spacing between the first post 320 and the sidewalls of the receiving portion 332, the platinum member 304 may thermally expand or contract over a temperature range (e.g., a range of ~1000° C.) without imparting strain that may adversely affect performance of the platinum resistance temperature sensor 500.

The platinum member 304 in this embodiment has exactly two prongs—the first prong 324 and the second prong 326—but may have more than two prongs in some embodiments. For instance, the platinum member 304 may have three prongs, two or more pairs of prongs, or even tens of prongs. Each of the prongs may have a corresponding subset of the set of wires 502 for external measurement.

Figure 7:
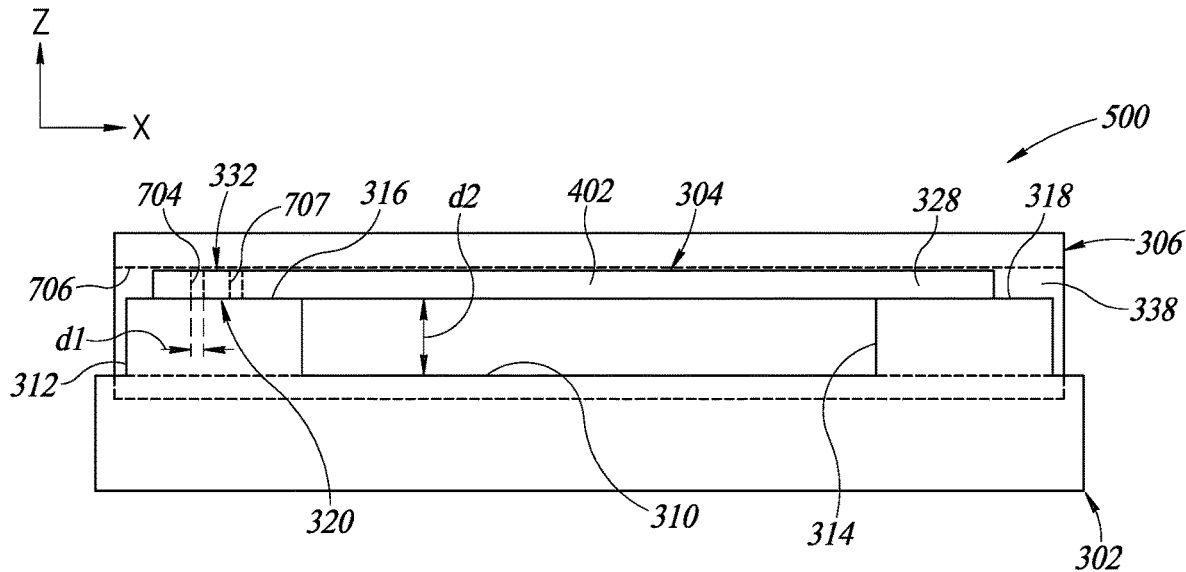
FIG. 7 shows a first cross-sectional side view of a platinum temperature sensor according to one or more embodiments.

FIG. 7 shows a side view of a cross section of the platinum resistance temperature sensor 500 taken along the line B-B of FIG. 5B according to one or more embodiments. A vertical axis of the first post 320 is coaxially aligned with a vertical axis of the receiving portion 332. Sidewalls 704 of the receiving portion 322 extend vertically through the entire base portion 322 to form a cylindrically-shaped cavity with apertures at an upper surface and a lower surface of the base portion 322. Vertically extending sides 702 of the first post 320 are laterally spaced apart from the sidewalls 704 at the distance d1, which may be 15 μm or greater to allow for relative movement and/or thermal expansion between the platinum member 304 and the first substrate 302, as described above with respect to FIG. 6. In some embodiments, the receiving portion 332 may only have a single aperture opening on a lower side of the base portion 322 and forming an enclosed cavity terminating within the base portion 322 (i.e., without the upper aperture). In such embodiments, the height of the first post 320 (i.e., along the z-axis) is less than the thickness of the base portion 322. It should be noted that the features depicted in FIG. 7 and elsewhere are not necessarily drawn to scale. For example, small dimensions may appear relatively larger so as to facilitate the description of the features.

The base portion 322 may be secured between the first support surface 316 and a lower surface 706 of the upper portion 336 of the second substrate 306. The distance between the lower surface 706 and the base portion 322, if any, should be small enough that the base portion 322 cannot be removed or separated from the first platform 312 without removal of the second substrate 306 from the platinum resistance temperature sensor 300. The end portions 328 and 330 respectively of the first prong 324 and the second prong 326, in some embodiments, may be secured between the second support surface 318 of the second platform 314 and the lower surface 706 of the second substrate 306 to prevent or limit vertical movement of the end portions 328 and 330. For example, the distance between the lower surface 706 and upper surfaces of the end portions 328 and 330 may be less than the thickness of the end portions 328 and 330. In some embodiments, the lower surface 706 may not be flat and may be higher in a middle portion above the medial portions 402 and 404, as described elsewhere herein.

The medial portion 402 of the first prong 324 and the medial portion 404 of the second prong 326 are suspended over or separated from the upper surface 310 of the first substrate 302 at a distance d2. The distance d2 shown in FIG. 7 is equal to a height (i.e., along the z-axis) of the first platform 312 and the second platform 314. Suspending the first prong 324 and the second prong 326 over the upper surface 310 permits the platinum member 304 to flex and reduces or prevents strain from being induced on the platinum member 304. Such induced strain may introduce error to resistance measurements of the platinum member 304. In at least some embodiments, the medial portions 402 and 404 of the first prong 324 and the second prong 326 may be spaced apart from the lower surface 706 of the second substrate 306, as described elsewhere herein.

Figure 8:
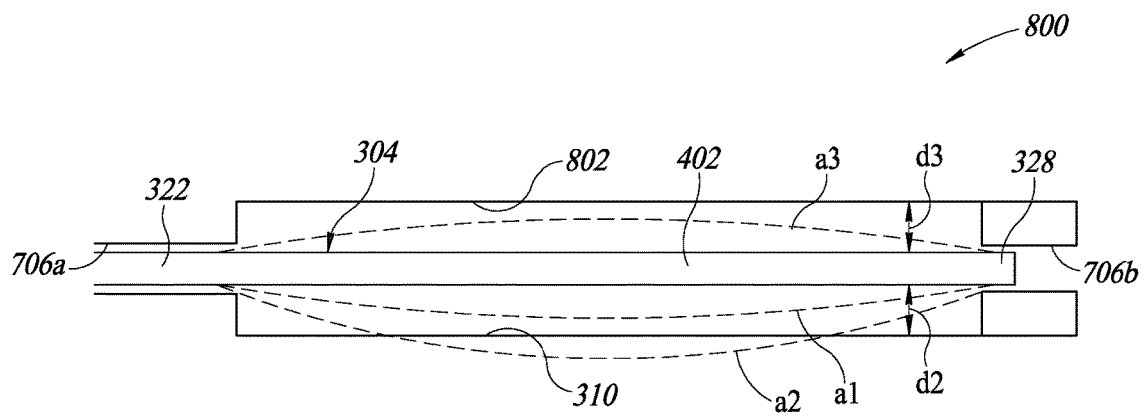
FIG. 8 shows a second cross-sectional side view of a platinum temperature sensor according to one or more embodiments.

FIG. 8 shows another side view of a cross section of a platinum resistance temperature sensor 800 taken along the line B-B of FIG. 5B according to one or more embodiments. The platinum resistance temperature sensor 800 includes the platinum member 304 provided between the first substrate 304 and the second substrate 306, as described above with respect to FIGS. 6 and 7. As with the configuration shown in FIG. 7, the medial portions 402 and 404 of the platinum member 304 are suspended at a distance d2 above the upper surface 310 of the first substrate 302. The platinum member 304 is permitted to deflect or be displaced by an amount a1 from a straight state due to gravity, vibration, impact, etc. The distance d2 can be selected such that the deflection amount a1 is insufficient to induce strain error into the platinum member 304. That is, contact of the medial portions 402 and 404 against the upper surface 310 as a result of deflection by the amount a1 prevents or reduces strain induced error in the platinum member 304. By contrast, without the upper surface 310 to limit deflection, the platinum member 304 might be permitted to deflect by an amount a2, which is greater than the deflection amount a1, sufficient to induce a strain error into the platinum member 304.

In the platinum resistance temperature sensor 800, the second substrate 306 has a medial lower surface 802 that is spaced apart at a distance d3 that is greater than a distance between a lower surface 706a of the second substrate 306 to the upper surface of the base portion 322 or a distance between lower surface 706b of the second substrate 306 to the upper surface of the end portions 328 and 330. The distance d3, in some embodiments, may be equal to the distance d2. The distance d3 permits the medial portions 402 and 404 to deflect toward the second substrate 306 by an amount a3 that is insufficient to introduce strain error into the platinum member 304.

Figure 9:
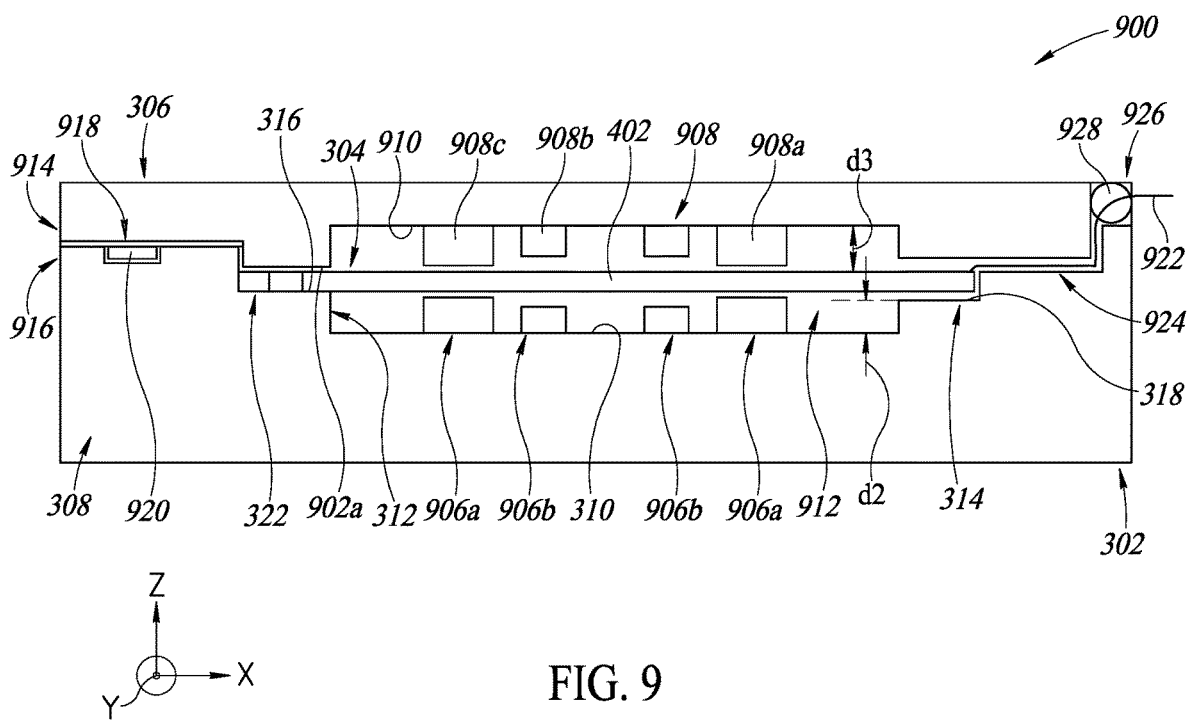
FIG. 9 shows third cross-sectional side view of a platinum temperature sensor according to one or more embodiments.

FIG. 9 shows an additional side view of a cross section of a platinum resistance temperature sensor 900 taken along the line B-B of FIG. 5B according to one or more embodiments. The platinum resistance temperature sensor 900 includes the platinum member 304 provided with a base portion 322 located between the first support surface 316 and a first surface 902 of the second substrate 306, as described with respect to FIGS. 7, 8, and elsewhere herein. End portions 328 and 330 of the platinum member 304 in the platinum resistance temperature sensor 900 are provided between the second support surface 318 and a second surface 904 of the second substrate 306 as described with respect to FIGS. 7, 8, and elsewhere herein.

The first substrate 302 may include a set of supports 906 projecting upwardly from the upper surface 310. The set of supports 906 support the medial portions 402 and 404 from underneath to prevent or limit the amount of downward deflection of the platinum member 304 in a direction toward the upper surface 310. The set of supports 906 may include one or more high supports 906a having a height (i.e., along the z-axis) as high as the first support surface 316 and the second support surface 318 to prevent deflection of the platinum member 304 at the support(s) 906a. The set of supports 906 may also include relatively short supports 906b with a height less than the first support surface 316 and the second support surface 318 to limit downward deflection of the platinum member 304. In some embodiments, one or more high support(s) 906a may be located closer to the base portion 322 and/or the end portions 328 and 330 than the short support(s) 906b. Each support of the set of supports 906 may have a width (i.e., along the y-axis) sufficient to support one or both of the first prong 324 or the second prong 326. The set of supports 906 may be spaced apart from the first platform 312 and the second platform 314 along the X-axis.

The second substrate 306 may include a set of spacers 908 projecting downwardly from the lower surface 910 of the second substrate 306, which is spaced apart from the platinum member 304. The set of second supports 908 space the medial portions 402 and 404 apart from the lower surface 910 from above to prevent or limit the amount of upward deflection of the platinum member 304 in a direction toward the lower surface 910. The set of spacers 908 may include one or more high spacers 908a having a height as high as the first surface 902 and/or the second surface 904 to prevent deflection of the platinum member 304 at the spacers 908a. The set of spacers 908 may also include relatively short spacers 908b with a height less than the first surface 902 and the second surface 904 to limit upward deflection of the platinum member 304. In some embodiments, the high spacer(s) 908a may be located closer to the base portion 322 and/or the end portions 328 and 330 than the short spacer(s) 908b. Each spacer of the set of spacers 908 may have a width (i.e., along the y-axis) sufficient to contact one or both of the first prong 324 or the second prong 326. The set of spacers 908 may be spaced apart from the first surface 902 and the second surface 904 along the X-axis.

The set of supports 906 and/or the set of spacers 908 may facilitate restriction of bending of the medial portions 402 and 404 in the height direction (along the z-axis) of the platinum resistance temperature sensor 900. In some embodiments, the platinum resistance temperature sensor 900 may include a set of supports and/or a set of spacers projecting from an interior surface of the first substrate or second substrate (along the y-axis) to restrict bending of the medial portions 402 and/or 404 in the width direction of the platinum resistance temperature sensor 900. In some embodiments, a support or spacer may extend between the medial portion 402 and the medial portion 404 to restrict bending of the medial portions 402 and 404 along the y-axis. In some embodiments, some of the set of supports 906 and/or the set of spacers 908 may be sized, shaped, and positioned to extend between adjacent prongs to restrict deflection of the prongs along the Y-axis.

The platinum member 304 may be located in a sealed cavity 912 of the platinum resistance temperature sensor 900 according to one or more embodiments. The first substrate 302 may have a peripheral portion 914 sized and shaped to abut with a corresponding peripheral portion 916 of the second substrate 306 to help seal the cavity 912. One or both of the peripheral portion 914 and the peripheral portion 916 may include a recess 918 in which a seal 920 formed of glass, fused silica, etc., may be provided to seal the cavity 912. The seal 918 corresponds to and may be formed according to the processes described herein with respect to the seal 340. One of the peripheral portions 914 and 916 may form a lip with respect to an external portion of the platinum resistance temperature sensor 900 to prevent or reduce the likelihood of contamination or damage to the seal 918. The peripheral portions 914 and 916 may extend peripherally around the cavity 912 (e.g., along planes coplanar with the x-y axes) to seal the cavity 912 and the platinum member 304 therein. The cavity 912 may be vacuum sealed or pressurized with an inert gas.

A set of wires 920 may be connected to the end portions 328 and 330 of the platinum member 304 at an end opposite to the base portion 322. A passageway 922 may be provided through a peripheral portion of the platinum resistance temperature sensor 900 to permit the set of wires 920 to reach an exterior 924 of the platinum resistance temperature sensor 900. The passageway 922 may be sized and shaped to allow the set of wires 920 to extend from the cavity 912 to the exterior 924 without compressing or damaging the wires 922. Although not shown, the recess 918 and the seal 920 may extend around an entire periphery of the cavity 912 and along the passageway 924 to seal the cavity 912. A seal 928 may be provided at an outlet of the passageway 924 at or near the exterior 916 to further seal the cavity 912, as described herein. A lip or other barrier may be provided over or at least partially surrounding the seal 928 to prevent contamination thereof in some embodiments. The platinum resistance temperature sensor 900 may include features similar to the previously described and illustrated embodiments whose description is omitted for brevity.

Figure 10:
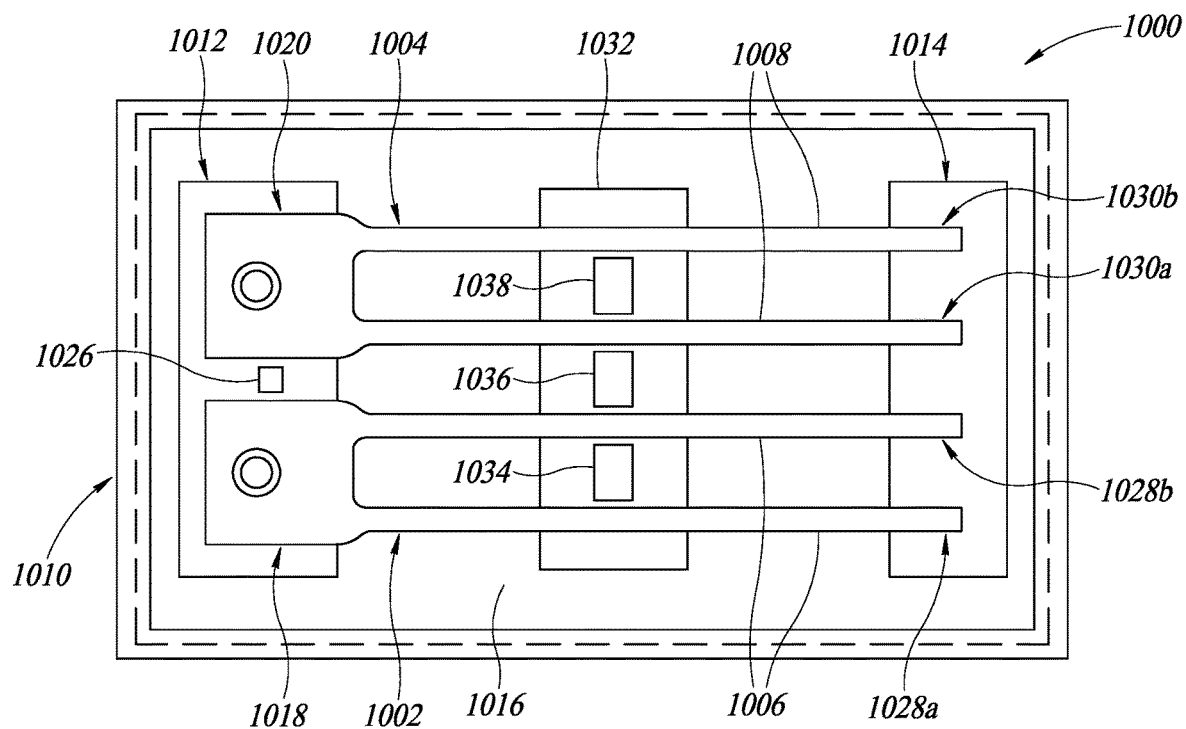
FIG. 10 shows a second cross-sectional top plan view of a platinum temperature sensor according to one or more embodiments.

FIG. 10 shows a top plan view of a cross section of a platinum resistance temperature sensor 1000 taken along the lines A-A of FIG. 5A according to one or more embodiments. The platinum resistance temperature sensor 1000 includes a first platinum member 1002 and a second platinum member 1004 arranged adjacent to the first platinum member 1002 in a width direction of the platinum resistance temperature sensor 1000 (i.e., along the y-axis). The first platinum member 1002 and the second platinum member 1004 may be identical or substantially similar to each other and the platinum member 304 described above. The first platinum member 1002 has a first pair of prongs 1006 extending in parallel in a length direction transverse to the width direction (i.e., along the x-axis) and the second platinum member 1004 has a second pair of prongs 1008 extending in parallel in the length direction.

The first platinum member 1002 has a first substrate 1010 with a first platform 1012 and a second platform 1014 spaced apart from each other in a length direction and extending upwardly from an upper surface 1016 of the first substrate 1010. A base portion 1018 of the first platinum member 1002 and a base portion 1020 of the second platinum member 1004 are located on a support surface 1022 of the first platform 1012. The base portion 1018 and the base portion 1020 may be adjacent to each other in the width direction of the platinum resistance temperature sensor 1000. The base portion 1018 and the base portion 1020 may be spaced apart from each other in the width direction. In some embodiments, the first platform 1012 may include a spacer 1026 extending upwardly from an upper surface of the first platform 1012 between the base portions 1018 and 1020 to prevent contact between the base portions 1018 and 1020, which could affect a resistance measurement. End portions 1028a and 1028b of the first pair of prongs 1006 and end portions 1030a and 1030b the second pair of prongs 1008 are positioned on and supported by a supporting surface of the second platform 1014.

In some embodiments, the first platinum member 1002 and the second platinum member 1004 may be a single monolithic platinum member connected by a length of platinum. For instance, the end portion 1028b of the first platinum member 1002 may be connected with the end portion 1030a of the second platinum member 1004 by a length of platinum extending between the end portions 1028b and 1030a.

In some embodiments, the platinum resistance temperature sensor 1000 may include a set of supports and/or a set of spacers that are sized, shaped, and positioned to extend between adjacent prongs to restrict deflection of the prongs in the width direction. For instance, a medial support 1032 may be provided that has a support surface that supports medial portions of the first pair of prongs 1006 and the second pair of prongs 1008 between the first platform 1012 and the second platform 1014. A support surface of the medial support 1032 may restrict downward deflection of the prongs. In some embodiments, the medial support 1032 may have a height less than a height of the first platform 1012 and/or the second platform 1014.

The medial support 1032, in some embodiments, may include portions that extend between prongs of the first pair 1006 and the second pair 1008 of prongs to restrict lateral deflection of the prongs (e.g., in a direction parallel to the Y-axis). A first portion 1034 of the medial support may extend upwardly between the first pair of prongs 1006 from the support surface of the medial support 1032, a second portion 1036 of the medial support may extend upwardly between adjacent prongs of the first pair of prongs 1006 and the second pair of prongs 1008, and a third portion 1038 of the medial support may extend upwardly between the second pair of prongs 1008. The first portion 1034, the second portion 1036, and the third portion 1038 of the medial support 1032 facilitate restriction of lateral deflection of the prongs.

There may be more than two platinum members in some embodiments. Having two or more platinum members provides redundancy in the event that one of the platinum members becomes damaged, or to provide a way to verify measurement results. In some embodiments, the platinum members may be different than each other. For instance, the first platinum member 1002 may have prongs spaced apart from each other at a different distance than the prongs of the second platinum member 1004.

Figure 11:
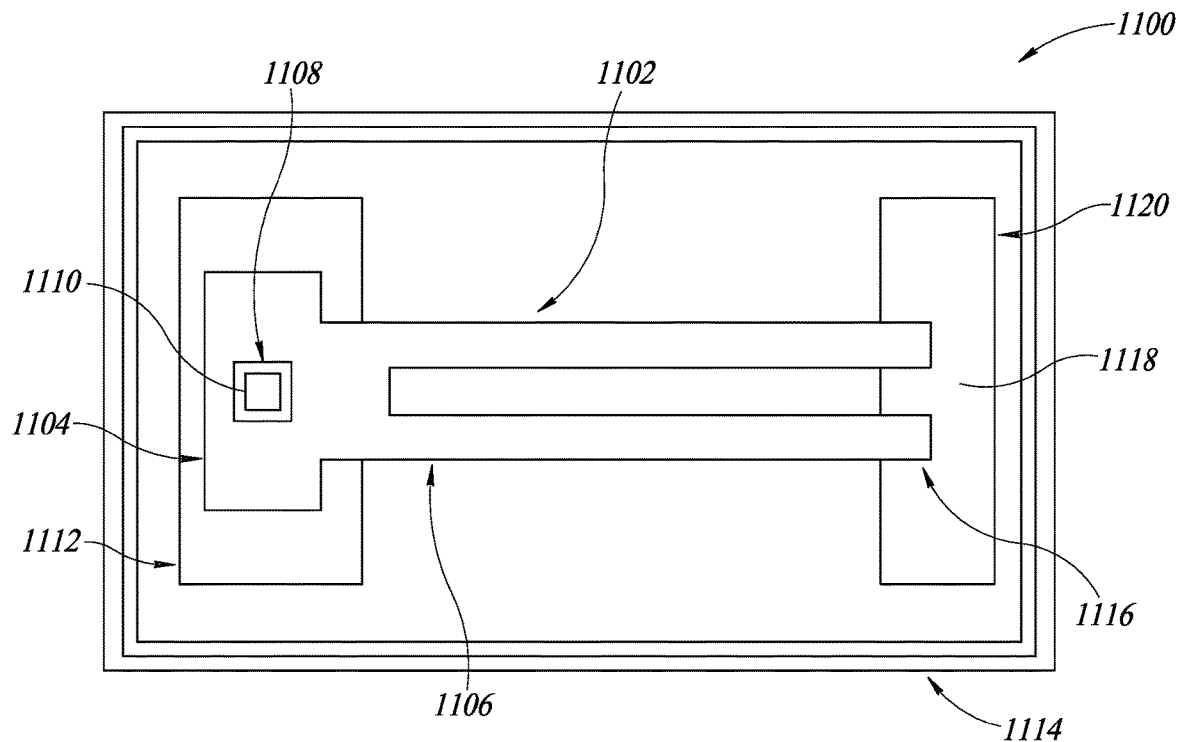
FIG. 11 shows a third cross-sectional top plan view of a platinum temperature sensor according to one or more embodiments.

The shapes of various parts of the platinum resistance temperature sensor may be changed in some embodiments. FIG. 11 shows a top plan view of a cross section of a platinum resistance temperature sensor 1100 according to one or more embodiments. The platinum resistance temperature sensor 1100 is substantially similar to the platinum resistance temperature sensor 300 described with respect to FIG. 6 and elsewhere herein with some exceptions. The platinum resistance temperature sensor 1100 has a platinum member 1102 with a base portion 1104 from which a pair of prongs 1106 extend. The base portion 1104 has a rectangular receiving portion 1108 for receiving a corresponding rectangular post 1110 extending upwardly from a first platform 1112 of a first substrate 1114 of the platinum resistance temperature sensor 1100.

The rectangular post 1110 is sized and shaped to be spaced apart from the rectangular receiving portion 1108 when the rectangular post 1110 is engaged within the rectangular receiving portion 1108. Engagement the rectangular post 1110 with the rectangular receiving portion 1008 limits potential movement and/or thermal expansion of the platinum member 1104 relative to the first substrate 1114, as described with respect to FIG. 6 and elsewhere herein. Additionally, the corresponding rectangular shapes of the receiving portion 1108 and the post 1110 may limit rotation of the platinum member 1104 relative to the first substrate 1114 so that end portions 1116 of the pair of prongs 1106 remain supported by a support surface 1118 of a second platform 1120, as shown. In some embodiments, the corresponding shapes of the post and receiving portion may be different—for example, the corresponding shapes may be hexagonal or triangular in some embodiments.

Figure 12:
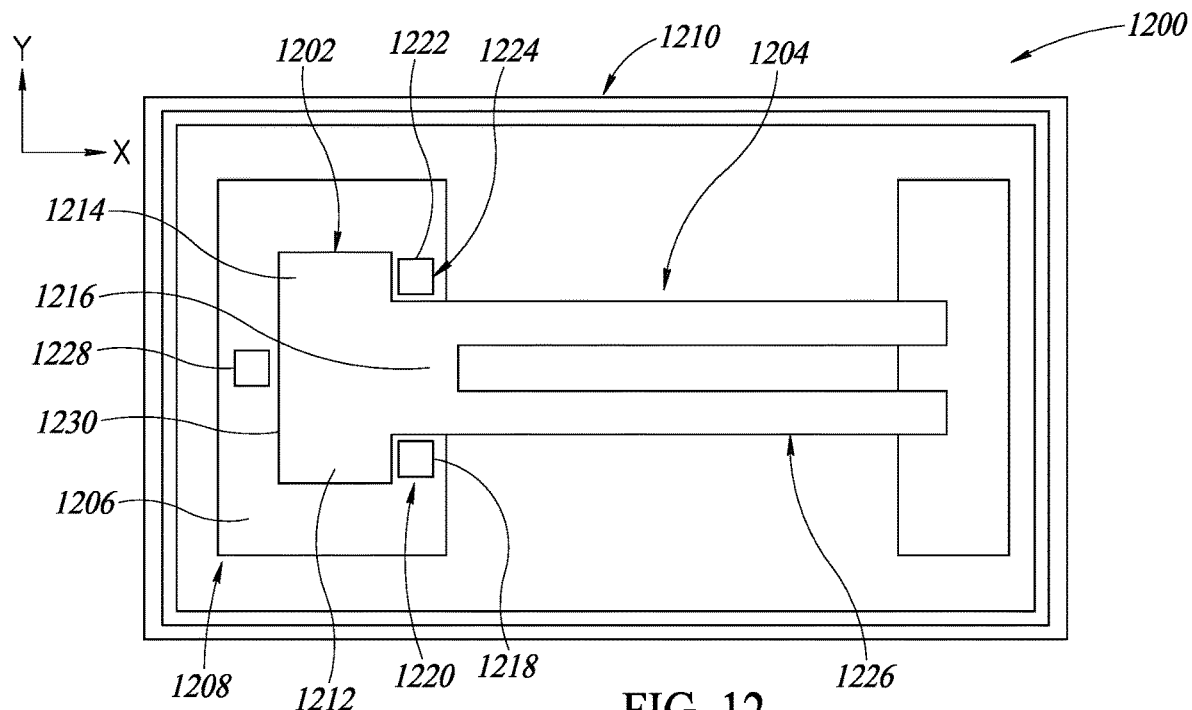
FIG. 12 shows a fourth cross-sectional top plan view of a platinum temperature sensor according to one or more embodiments.

The base portion of the platinum member may not include a receiving portion in some embodiments. FIG. 12 shows a top plan view of a cross section of a platinum resistance temperature sensor 1200 according to one or more embodiments. The platinum resistance temperature sensor 1200 includes a base portion 1202 of a platinum member 1204 whose movement is restricted by a plurality of posts projecting upwardly from a first support surface 1206. The first support surface 1206 is provided on a first platform 1208 extending upwardly from an upper surface of a first substrate 1210, as discussed elsewhere herein.

The base portion 1202 includes a first section 1212 and a second section 1214 extending laterally (i.e., along the y-axis) from a central section 1216 of the platinum member 1204. A first corner or bend 1220 is formed in the platinum member 1204 at the intersection of the first section 1212 and the central section 1216, and a second corner or bend 1224 is formed in the platinum member 1204 at the intersection of the second section 1214 and the central section 1216.

A first post 1218 extends upwardly from the first support surface 1206 adjacent to or in the first corner 1220 and a second post 1222 extends upwardly from the first support surface 1206 adjacent to or in the second corner 1224. A third post 1228 extends upwardly from the first support surface 1206 on a rear side 1230 of the platinum member 1204. In a rest state or non-thermally contracted or expanded state, the base portion 1202 may be spaced apart from each of the plurality of posts. For instance, the first post 1218 may be spaced apart from the first section 1212 in a length direction (i.e., along the x-axis), the second post 1222 may be spaced apart from the second section 1214 in the length direction, and the third post 1228 may be spaced apart from the rear side 1230 in the length direction. Moreover, the first post 1218 may be spaced apart from the central section 1216 in the width direction (i.e., along the y-axis), and the second post 1222 may be spaced apart from the central section 1216 in the width direction on an opposite side of the central section 1216 to the first post 1218. The distances between the base portion 1202 and each of the plurality of posts may be 15 μm or greater, for instance.

The relative location of the plurality of posts with respect to the base portion 1202 permits, but also restricts, longitudinal movement or thermal expansion (i.e., along the x-axis) of the platinum member 1204 relative to the first substrate 1210. The relative location of the first post 1218 and the second post 1222 relative to the base portion 1202 permits, but also restricts, lateral movement or thermal expansion (i.e., along the y-axis) of the platinum member 1204 relative to the first substrate 1210. This provides the benefit of allowing the platinum member 1204 to thermally expand or contract over a temperature range (e.g., a range of ~1000° C.) without imparting strain that may adversely affect performance of the platinum resistance temperature sensor 1200. The arrangement of the platinum resistance temperature sensor 1200 may also improve efficiency and/or cost associated with production of the platinum member 1204 as a result of omission of the receiving portion from the base portion 1202.

In some embodiments, the rear side 1230 of the base portion 1202 may include a notch into which the third post 1228 fits and is spaced apart from the base portion 1202, as described herein. In some embodiments, the first corner 1220 and the second corner 1224 have rounded edges and the first post 1218 and the second post 1222 each have a circular cross-sectional shape corresponding to the rounded edges of the corners. A pair of prongs 1226 extends out from the central section 1216 and over an upper surface of the first substrate 1210. In the embodiment of the platinum resistance temperature sensor 1200 shown, the central section 1216 extends outwardly in a length direction over the upper surface 1232 of the first substrate 1210 to form the first corner 1220 and the second corner 1224. In some embodiments, the central section 1216 may not extend outwardly and the pair of prongs 1226 may form the first corner 1220 and the second corner 1224.

Figure 13:
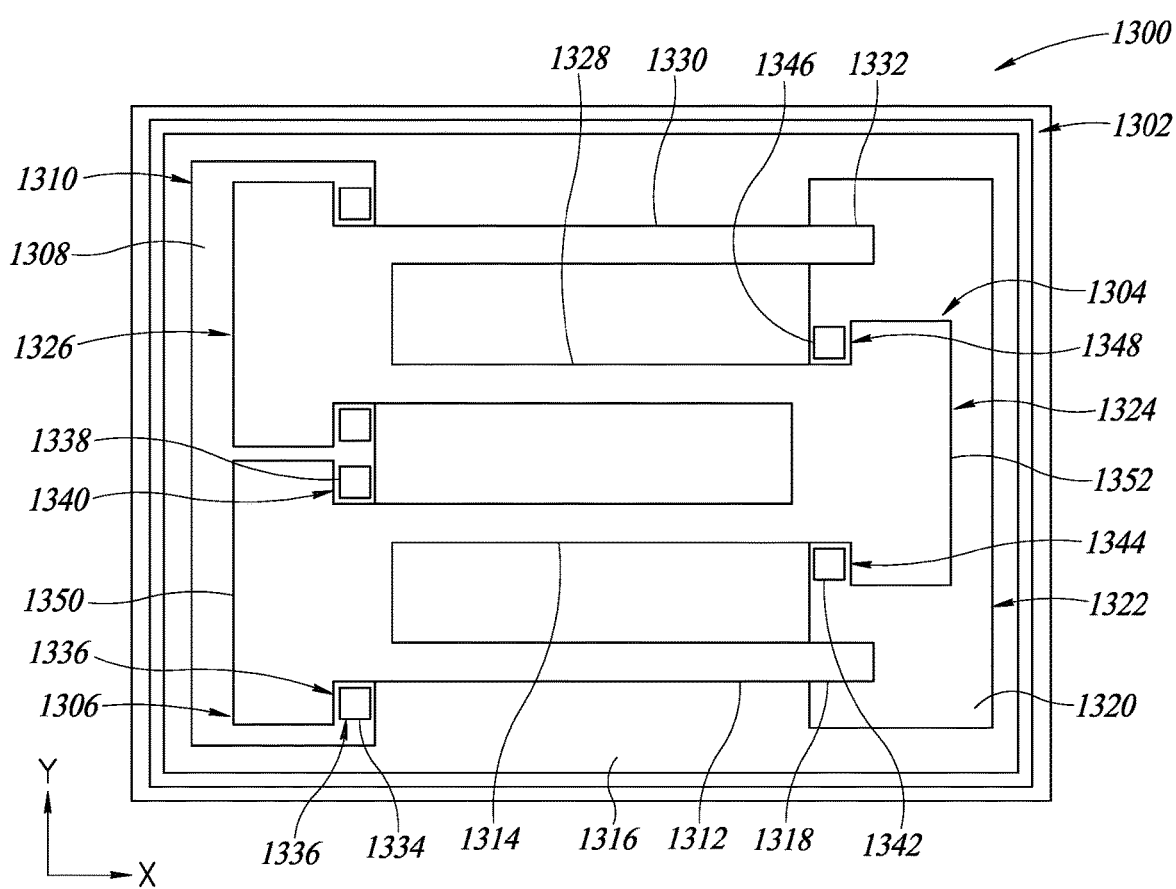
FIG. 13 shows a fifth cross-sectional top plan view of a platinum temperature sensor according to one or more embodiments.

In some embodiments, the platinum member may form a network of base portions and prongs. FIG. 13 shows a top plan view of a cross section of a platinum resistance temperature sensor 1300 taken along the lines A-A of FIG. 5A according to one or more embodiments. The platinum resistance temperature sensor 1300 comprises a first substrate 1302 and a platinum member 1304 that includes a plurality of base portions and a network of prongs connecting the base portions. The platinum member 1304 includes a first base portion 1306 positioned on a first support surface 1308 of a first platform 1310 of the first substrate 1302. A first prong 1312 and a second prong 1314 extend outwardly from the first base portion 1306 and have respective medial portions suspended over an upper surface 1316 of the first substrate 1304, as described herein.

An end portion 1318 of the first prong 1312 contacts and is supported by a second support surface 1320 on top of a second platform 1322 that extends upwardly from the upper surface 1316. A second base portion 1324 of the platinum member 1304 is positioned on and supported by the second support surface 1320. The second base portion 1324 is located adjacent to the end portion 1318 in a width direction of the second platform 1322. The second prong 1314 extends between and connects the first base portion 1306 to the second base portion 1324. A medial portion of the second prong 1314 is suspended over the upper surface 1316.

The platinum member 1304 includes a third base member 1326 positioned on and supported by the first support surface 1308. The third base portion 1326 is located adjacent to the first base portion 1306 in the width direction of the platinum resistance temperature sensor 1300. A third prong 1328 extends between and connects the second base portion 1324 to the third base portion 1326. A medial portion of the third prong 1328 is suspended over the upper surface 1316.

A fourth prong 1330 extends outwardly from the third base portion 1326 and has a medial portion suspended over the upper surface 1310. An end portion 1332 of the fourth prong 1330 contacts and is supported by the second support surface 1320 of the second platform 1322.

The base portions and prongs of the platinum member 1304 form a network of sections extending back and forth on the first substrate 1302. Movement and/or thermal expansion/contraction of the platinum member 1304 relative to the first substrate 1302 may be restricted by a plurality of posts extending upwardly from the first platform 1310 and/or the second platform 1322. A first post 1334 extends upwardly from the first support surface 1308 at a location adjacent to a first corner or bend 1336 of the first base portion 1306, as described above with respect to FIG. 12. A second post 1338 extends upwardly from the first support surface 1308 at a location adjacent to a second corner or bend 1340 of the first base portion 1306 opposite to the first corner. The first post 1334 is spaced apart from the first corner 1336 and the second post 1338 is spaced apart from the second corner 1340, as described above with respect to FIG. 12. The first corner 1336 and the second corner 1340 are located on a side of the first base portion 1306 facing the second base portion 1324.

A third post 1342 extends upwardly from the second support surface 1320 at a location adjacent to a third corner or bend 1344 of the second base portion 1324. A fourth post 1346 extends upwardly from the second support surface 1320 at a location adjacent to a fourth corner or bend 1348 of the second base portion 1324 opposite to the third corner 1344. The third post 1342 is spaced apart from the third corner 1344 and the fourth post 1346 is spaced apart from the fourth corner 1348, as described above with respect to FIG. 12. The third corner 1344 and the fourth corner 1348 are located on a side of the second base portion 1324 facing the first base portion 1306.

The first post 1336 and the second post 1338 help to limit lateral displacement (e.g., movement, thermal expansion/contraction) of the platinum member 1304 (i.e., along directions parallel with the y-axis). The third post 1342 and the fourth post 1346 help to limit lateral displacement of the platinum member 1304. The surfaces of the corners 1336 and 1340 of the first base portion 1306 oppose surfaces of the corners 1344 and 1348 of the second base portion 1324, which helps to limit longitudinal displacement (e.g., movement, thermal expansion/contraction) of the platinum member 1304. That is, the first and second posts 1336 and 1338 restrict displacement of the platinum member 1304 in a first longitudinal direction and the third and fourth posts 1342 and 1346 restrict displacement in a second longitudinal direction opposite to the first longitudinal direction. As a result, it may be unnecessary to provide a post on the first platform 1310 adjacent to a rear side 1350 of the first base portion 1306 or a post on the second platform 1322 adjacent to a rear side 1352 of the second base portion 1324. The first platform 1310 may also include a set of posts adjacent to corners of the third base portion 1326 in a manner similar to the first base portion 1306.

In the platinum resistance temperature sensor 1300 shown, the first prong 1312, the second prong 1314, the third prong 1328, and the fourth prong 1330 extend in parallel with each other in longitudinal directions. In some embodiments, however, one or more of the first prong 1312, the second prong 1314, the third prong 1328, and the fourth prong 1330 may not all extend in parallel with each other. For instance, the first prong 1312 may extend at an angle with respect to the x-axis and/or the second prong 1314 may extend at an angle with respect to the x-axis.

The platinum member 1304 shown includes three base portions connected by prongs; however, the platinum member 1304 may include more than three base members connected by prongs. In the platinum resistance temperature sensor 1300, two prongs of the plurality of prongs have a single end portion unconnected to a base portion—namely, the end portion 1318 of the first prong 1312 and the end portion 1332 of the fourth prong 1330. A first set of wires may be connected to the end portion 1318 and a second set of wires may be connected to the end portion 1332 to obtain resistance measurements of the platinum member 1304 using a device external to the platinum resistance temperature sensor 1300, as described herein. In some embodiments, the platinum resistance temperature sensor 1300 may have two base portions and not include the third base portion 1326 or the fourth prong 1330. In such embodiments, an end portion of the third prong 1328 may be provided for connection of a set of wires.

In some embodiments, the platinum resistance temperature sensor 1300 may instead have one or more receiving portions that restrict displacement of the platinum member 1304, as described with respect to FIGS. 4 and 6 and elsewhere herein. For instance, the first base portion 1306 may include a receiving portion for receiving a corresponding post projecting upwardly from the first support surface 1308. The second base portion 1324 and/or the third base portion 1326 may also include a receiving portion for receiving a corresponding post projecting upwardly from the second support surface 1320 or the first support surface 1308.

Similar to the embodiments shown in FIGS. 9 and 10, the platinum resistance temperature sensor 1300 in FIG. 13 may include a set of supports and/or a set of spacers to restrict deflection of the first prong 1312, the second prong 1314, the third prong 1328, and/or the fourth prong 1330 in one or more directions. In some embodiments, such supports or spacers may have surfaces that facilitate restriction of vertical deflection of the prongs. In some embodiments, such supports or spacers may have portions that extend between or on lateral sides of the prongs to facilitate restriction of lateral deflection of the prongs. However, such supports and/or spacers are omitted from FIG. 13 for brevity.

Figure 14:
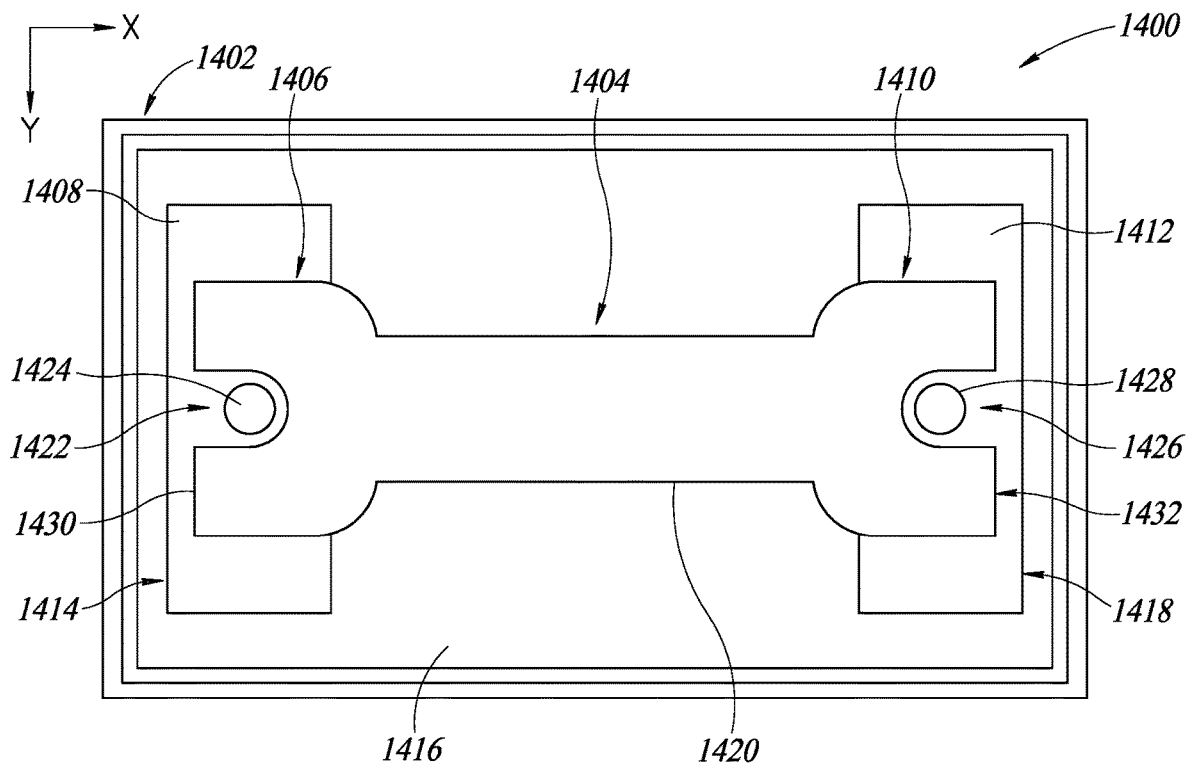
FIG. 14 shows a sixth cross-sectional top plan view of a platinum temperature sensor according to one or more embodiments.

FIG. 14 shows a top plan view of a cross section of a platinum resistance temperature sensor 1400 taken along the lines A-A of FIG. 5A according to one or more embodiments. The platinum resistance temperature sensor 1400 comprises a first substrate 1402 and a platinum member 1404 having a first base portion 1406 supported by a first support surface 1408 of the first substrate 1402 and having a second base portion 1410 supported by a second support surface 1412 of the first substrate 1402. The first support surface 1408 is defined by an upper portion of a first platform 1414 projecting upwardly from an upper surface 1416 of the first substrate 1402, and the second support surface 1412 is defined by an upper portion of a second platform 1418 projecting upwardly from the upper surface 1416 and being spaced apart in a length direction from the first platform 1414. The first platform 1414 and the second platform 1418 may have the same height as each other.

The platinum member 1404 has a bridge portion 1418 extending between and connecting the first base portion 1406 and the second base portion 1410. The bridge portion 1420 of the platinum member 1404 is suspended above the upper surface 1416 at a distance equal to the height of the first platform 1414 and the second platform 1418. The bridge portion 1420 may be wider in a width direction of the platinum resistance temperature sensor 1400 (i.e., along the y-axis) relative to the first base portion 1406 and/or second base portion 1410 than the prongs of the platinum resistance temperature sensor 300 are relative to the base portion 406 (see, e.g., FIG. 4). In some embodiments, the bridge portion 1420 may have a width equal to or greater than a width of the first or second base portions 1406 and 1410. Having a wider bridge portion 1420 may provide greater structural integrity (e.g., resilience, resistance to deformation or deflection) than the prongs described herein.

The first base portion 1406 shown has a first notch 1422 for receiving a first post 1424 projecting upwardly from the first support surface 1408. The second base portion 1410 has a second notch 1426 for receiving a second post 1428 projecting upwardly from the second support surface 1412. The first notch 1422 is an indentation or recess in a first end 1430 of the platinum member 1404 and the second notch 1422 is an indentation or recess in a second end 1432 of the platinum member 1404 opposite to the first end 1430. The shapes of the first notch 1422 and the second notch 1426 respectively correspond to cross-sectional shapes of the first post 1424 and the second post 1428. The sizes of the first notch 1422 and the second notch 1426 are respectively larger than the cross-sectional areas of the first post 1424 and the second post 1428 to permit displacement (e.g., movement, thermal expansion/contraction) of the platinum member 1404 relative to the first substrate 1402. For example, with the first post 1424 centered in the first notch 1422, a peripheral edge of the first post 1424 may be spaced apart from sidewalls of the first notch 1422 at a distance of 15 µm or greater. The first post 1424 and the second post 1428 shown in FIG. 14 have a round cross-sectional shape, but may have a different cross-sectional shape in some embodiments—for instance, a triangular, rectangular, or polygonal shape. In some embodiments, one or both notches may have a different shape than the corresponding post. The first notch 1422, for example, may have a rectangular shape and the first post 1424 may have a circular cross-sectional shape.

In some embodiments, the first base portion 1406 and/or second base portion 1410 may have a receiving portion (e.g., recess, through hole) instead of a notch. The platinum member 1404 may be retained to the first substrate 1402 by an opposing second substrate (see, e.g., FIG. 9).

Wires may be connected or attached to the first base portion 1406 and the second base portion 1410 to obtain resistance measurements of the platinum member 1404, as described herein. For instance, a first set of wires may be attached via platinum pads to the first base portion 1406 and a second set of wires may be attached via platinum pads to the second base portion 1410. The first and second set of wires may extend to an exterior of the platinum resistance temperature sensor 1400 for electrical connection to a measurement device, as described with respect to FIG. 9 and elsewhere herein.

The arrangement of the platinum resistance temperature sensor 1400 may have features similar to other platinum resistance temperature sensors described herein, so further description thereof is omitted.

Figure 15:
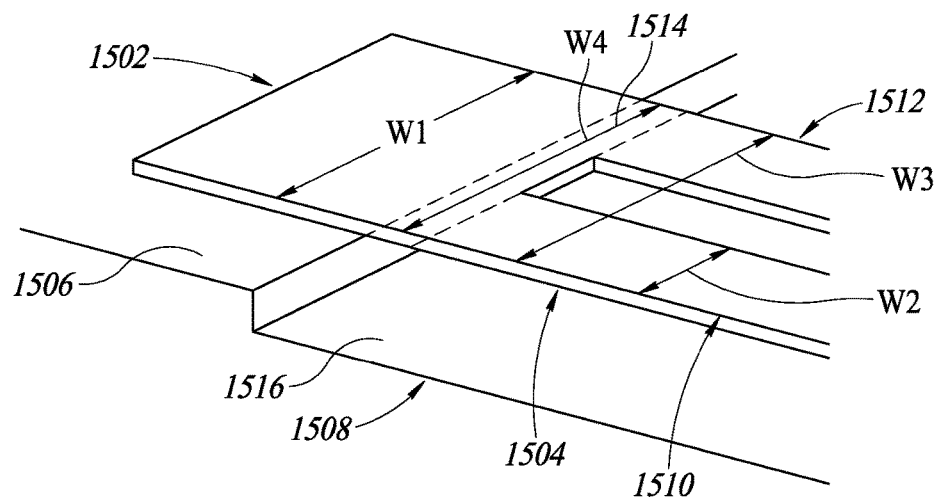
FIG. 15 shows a first partial isometric view of a platinum member of a platinum temperature sensor according to one or more embodiments.

Dimensions of the platinum member described herein may be selected to provide the appropriate mechanical support. FIG. 15 shows an isometric view of a base portion 1502 of a platinum member 1504 supported by a platform 1506 of a first substrate 1508. A first prong 1510 and a second prong 1512 extend outwardly from the base portion 1502, as previously described. The width of the base portion 1502 can be selected to adjust the bending moment of inertia to limit stress at supporting locations of the platinum member 1504. A width w1 of the base portion 1502 is greater than a width w2 of the first prong 1510, for instance. The width w1 of the base portion 1502 may be equal to or greater than a width w3 between lateral sides of the first prong 1510 and the second prong 1512. A section 1514 of the base portion 1502 may be suspended over an upper surface 1516 of the first substrate 1508. A width w4 of the section 1514 may be selected to adjust the bending moment of inertia. In some embodiments, the section 1514 may have a tapered shape that tapers in the width direction toward the pair of prongs.

Figure 16:
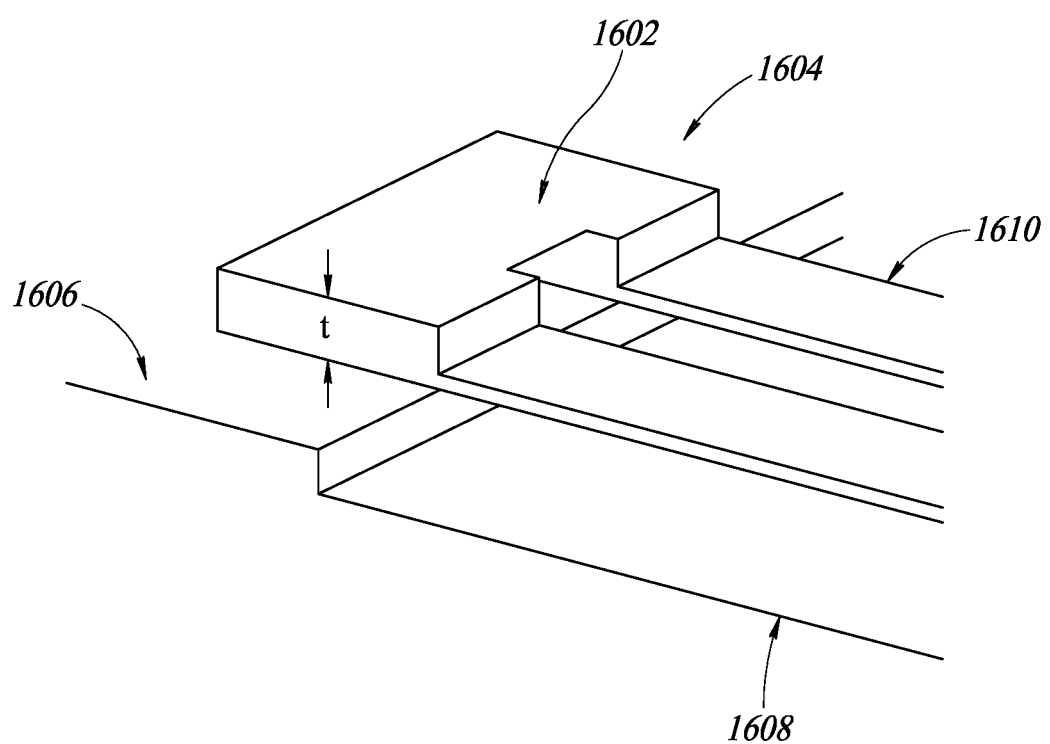
FIG. 16 shows a second partial isometric view of a platinum member of a platinum temperature sensor according to one or more embodiments.

FIG. 16 shows another isometric view of a base portion 1602 of a platinum member 1604 supported by a platform 1606 of a first substrate 1608. A thickness t of the base portion 1602 may be selected to adjust to adjust the structural integrity of the platinum member 1604. The thickness t of the base portion 1602 is greater than a thickness of the prongs 1610 extending therefrom. The thickness t of the base portion may be the same as the thickness of the prongs 1610 in some embodiments. In some embodiments, the thickness t of the base portion 1602 may taper in a length direction of the platinum member 1604.

In some embodiments, the platinum resistance temperature sensor described herein may not include posts extending upwardly from a support surface of the first substrate. For instance, the platinum member may be adhesively attached to the support surface of the first substrate using a material that has a similar CTE to platinum. The adhesive may include or have mixed therein filler material, such as silicon dioxide, that has a similar CTE to platinum.

The CTE of platinum is around 9 ppm/° C. and increases to over 10 ppm/° C. at high temperatures. Materials considered as having a similar CTE would have a CTE profile over a wide range of temperature (e.g., −100° C. to 1000° C.) within ±0.5 ppm/° C. of the CTE profile of platinum.

The various embodiments described above relate to a platinum resistance temperature sensor having a rectangular geometry; however, the technology represented by this disclosure is not so limited. The platinum resistance temperature sensor may have other geometries. For instance, the platinum resistance temperature sensor may comprise a platinum member suspended over a main body positioned within a sleeve.

Figure 17:
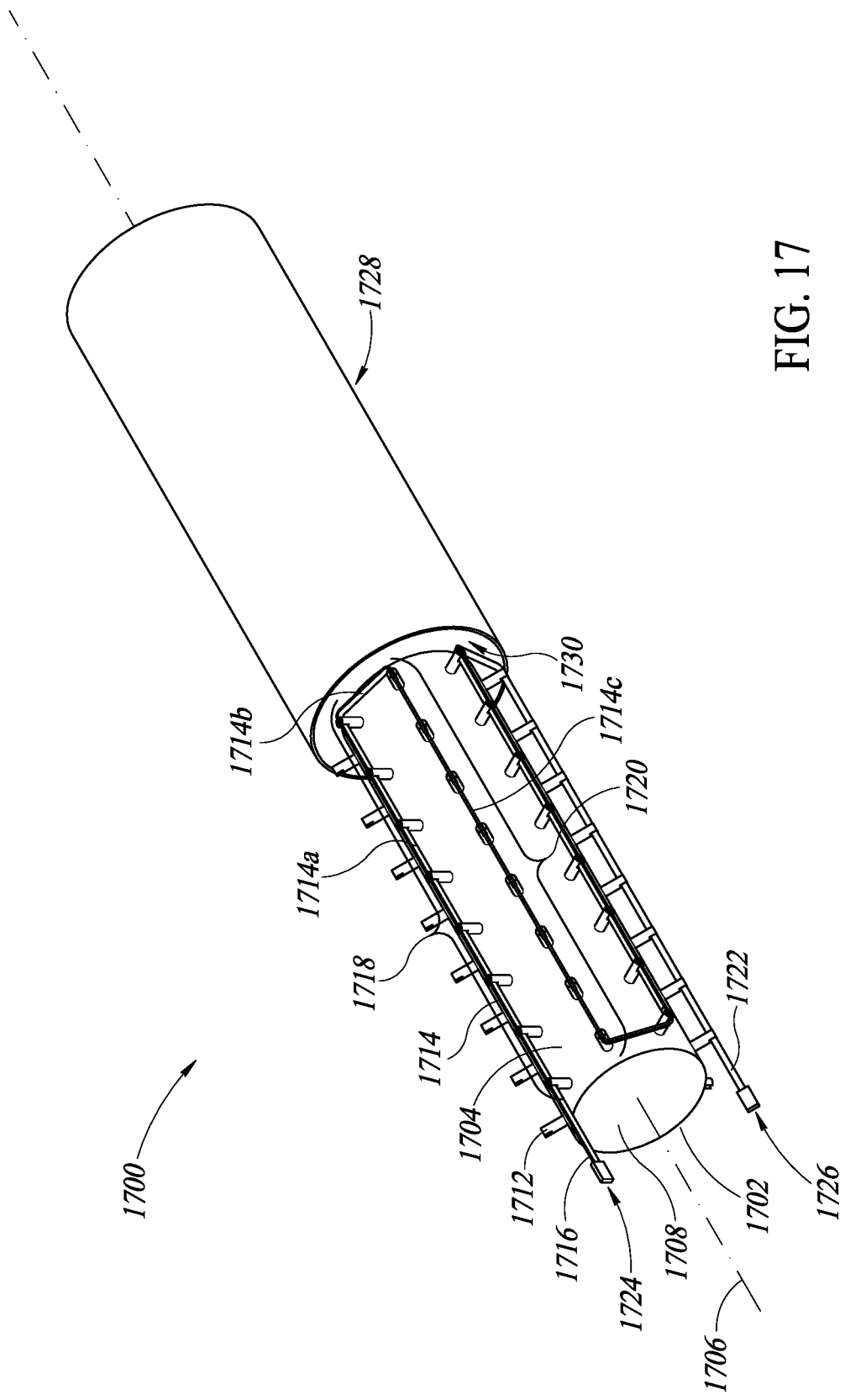
FIG. 17 shows a partially-exploded view of a platinum resistance temperature sensor having a linearly wound platinum member according to one or more embodiments.

FIG. 17 shows a partially-exploded view of a platinum resistance temperature sensor 1700 according to one or more embodiments. The platinum resistance temperature sensor 1700 includes a main body 1702 having a peripheral surface 1704 extending along an axis 1706 to define a length of the body between a first end 1708 and a second end 1710 (see FIG. 18) of the main body 1702. The main body 1702 may be formed of alumina and may have a very high degree of purity, as described above with respect to the first substrate 302. In this embodiment, the main body 1702 has a cylindrical shape with a circular cross-section extending along the axis 1706.

The platinum resistance temperature sensor 1700 also includes a plurality of support structures arranged along the main body 1702 and projecting radially outward from the peripheral surface 1704 in directions transverse to the axis 1706. In this embodiment, the support structures 1712 are elongated members, such as posts, poles, or fins, each having a length projecting outwardly from a different location on the peripheral surface 1704. The support structures 1712 may be formed of the same or similar material as the main body 1702—for instance, formed of alumina.

The plurality of support structures may be symmetrically arranged on the peripheral surface 1704. As one example, the plurality of support structures may comprise support structures 1712 circumferentially arranged in ring formations around the axis 1706. Each ring formation is located at a different location along the length of the main body 1702, and each ring formation includes a subset of the plurality of support structures arranged around the axis 1706. The support structures 1712 of each ring formation are circumferentially spaced apart from each other at equal distances around the axis 1706. Adjacent support structures 1712 along the length of the main body 1702 may be aligned with each other in a direction parallel to the axis 1706. For example, a first support structure of a first ring formation of the plurality of support structures may be aligned with a second support structure 1712b of a second ring formation of the plurality of support structures adjacent to the first ring formation in a direction parallel to the axis 1706. In some embodiments, however, the support structures 1712 of adjacent ring formations may be radially offset from each other around the axis 1706.

The platinum resistance temperature sensor 1700 includes a platinum member 1714 extending along a length of the main body 1702 and suspended over the peripheral surface 1704 by a set of support structures of the plurality of support structures. The set of support structures that suspend the platinum member 1714 may be a proper subset of the plurality of support structures. The platinum member 1714 is a thin, elongated member formed of platinum having a high degree of purity—for instance, a purity equal to or greater than 99% platinum. In some embodiments, the platinum member 1714 may be a length of platinum wire. In some embodiments, the platinum member 1714 may be a length of platinum foil having a width and a thin thickness relative to its width. The platinum member 1714 may be flexible to allow it to bend around support structures or deflect in a radial direction of the main body 1702 as described elsewhere herein.

The platinum member 1714 may wind back and forth along the length of the main body 1702 and be supported by the set of the plurality of support structures. In this embodiment, the platinum member 1714 may have a first end 1716 located at or near the first end 1708 of the main body 1702. The platinum member 1714 extends in a first direction from the first end 1708 toward the second end 1710 of the main body 1702 opposite to the first end 1708. A first length 1714a of the platinum member 1714 is supported by and suspended over the peripheral surface 1704 by a first set of support structures 1718 of the plurality of support structures, which are arranged along the length of the main body 1702. A second length 1714b of the platinum member 1714 extends transversely from the end of the first set of support structures 1718 to a second set of support structures 1720 that are laterally offset about the axis 1706 from the first set of support structures 1718 along the peripheral surface 1704.

The platinum member 1714 may then wind back toward the first end 1708. A third length 1714c of the platinum member 1714 extends back toward the first end 1708 of the main body 1702 in a second direction different than the first direction. The third length 1714c is supported by and suspended over the peripheral surface 1704 by the second set support structures 1720, which are arranged along the length of the main body 1702. The platinum member 1714 may include additional lengths that continuously wind back and forth in this manner along the length of the main body 1702. The platinum member 1714 terminates at a second end 1722 of the platinum member 1714 located at or near the first end 1708 of the main body 1702.

The platinum resistance temperature sensor 1700 may also include a first terminal 1724 attached to the first end 1716 of the platinum member 1714 and may include a second terminal 1726 attached to the second end 1722 of the platinum member 1714. The first terminal 1724 and the second terminal 1726 may be electrically and physically connected respectively to the first end 1716 and the second end 1722. The first terminal 1724 and the second terminal 1726 may be conductive elements provided to measure the resistance of the platinum member 1714. The first terminal 1724 and the second terminal 1726 shown in FIG. 17 are each conductors that may have one or more forms. For instance, the first terminal 1724 and the second terminal 1726 may each comprise a pair of wires coupled to the first and second ends 1716 and 1722. However, in some embodiments, the first terminal 1724 and the second terminal 1726 may each comprise one or more rigid conductive members, such as a plate, prong, or pin having a rigidity higher than the rigidity of the platinum member 1704. The first terminal 1724 and the second terminal 1726 may have properties similar to the set of wires 502 described above with respect to FIG. 5A and elsewhere herein.

Figure 18:
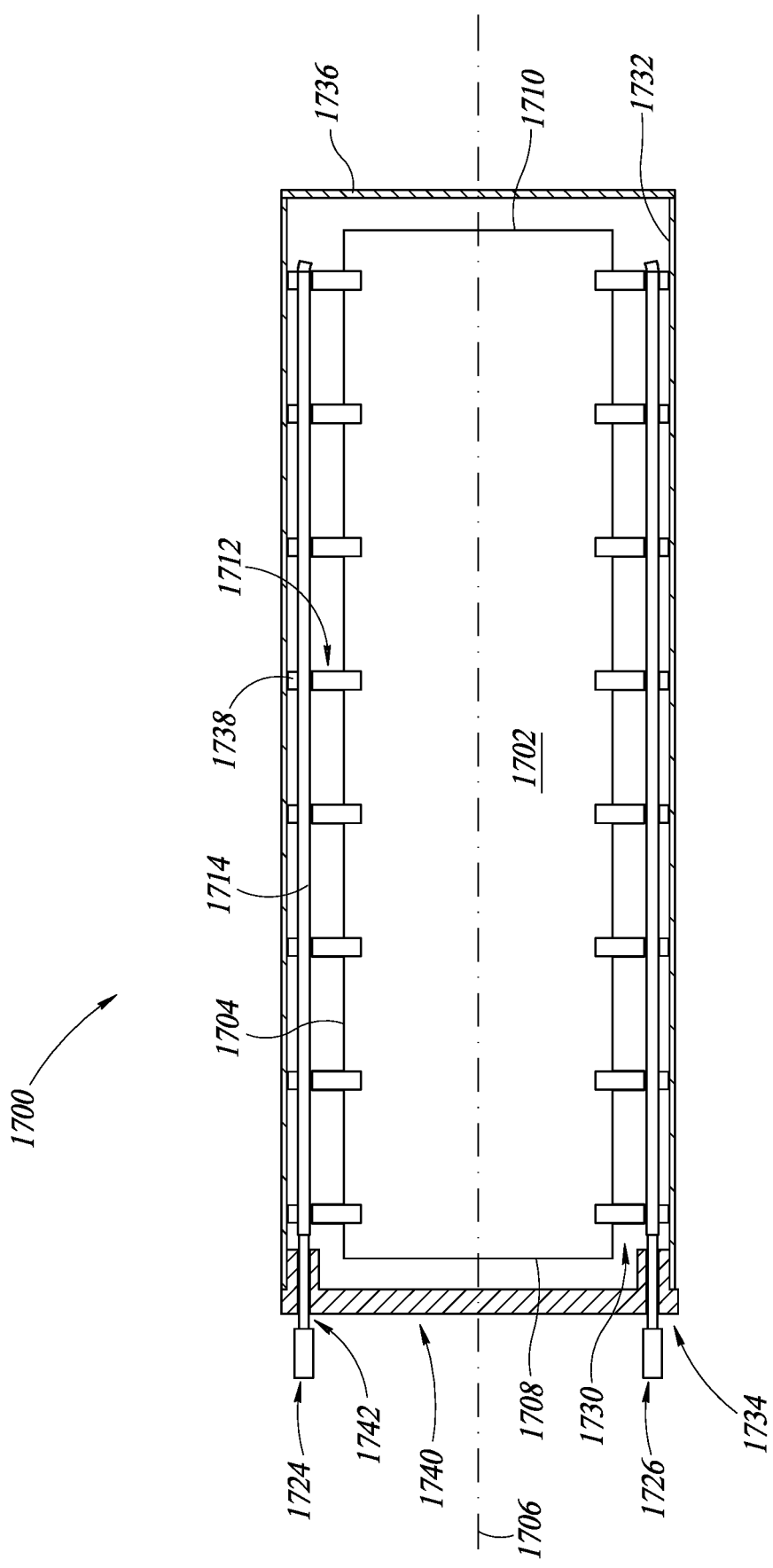
FIG. 18 shows a cross-sectional view of the platinum resistance temperature sensor of FIG. 17.

FIG. 18 shows a cross-sectional side view of the platinum resistance temperature sensor 1700 according to one or more embodiments. The platinum resistance temperature sensor 1700 may further comprise a sleeve 1728 (see FIG. 17) having a cavity 1730 sized and shaped to receive the main body 1702 within the cavity 1730. The cavity 1730 is defined by one or more sidewalls 1732 extending between an open first end 1734 and a closed second end 1736 of the sleeve 1728. The sidewalls 1732 extend generally in a direction parallel to the axis 1706 from the closed second end 1736. The sidewalls 1732 have a length that is longer than the length of the main body 1702 for enclosing the peripheral surface 1704 of the main body 1702. The main body 1702 may therefore be completely inserted within the cavity 1730.

The cavity 1730 has a shape generally corresponding to the cross-sectional shape of the main body 1702, though the shape of the cavity may be different in other embodiments. In this embodiment, the cavity 1730 has a circular cross-sectional shape corresponding to the cylindrical shape of the main body 1702. The sidewalls 1732 are spaced apart from each other such that, with the main body 1702 positioned within the cavity 1730, ends 1738 of the plurality of support structures abut or are in close proximity to opposing sidewalls 1732.

The plurality of support structures support and suspend the main body 1702 in the cavity such that the peripheral surface 1704 is spaced apart from, and laterally secured between, the sidewalls 1732. The main body 1702 may also be longitudinally secured within the cavity 1730 such that the main body 1702 does not move relative to the sleeve 1728. For instance, the second end 1710 of the main body 1702 may be in contact with the closed second end 1736. In some embodiments, the second end 1710 of the main body 1702 may be secured (e.g., via adhesive, via fasteners, via threaded connection) to the second closed end 1736.

The platinum resistance temperature sensor 1700 also includes a seal member 1740 extending between the sidewalls 1732 to seal the main body 1702 and platinum member 1714 in the cavity 1730. The first terminal 1724 and the second terminal 1726 extend through the seal member 1740 to an exterior of the platinum resistance temperature sensor 1700. Temperature resistance measurements of the platinum member 1714 may be obtained using the first terminal 1724 and the second terminal 1726. Sealing the platinum member 1714 in the cavity 1730 suspended over the main body 1702 facilitates prevention of contaminates from migrating into the cavity 1730 to the platinum member 1714, as described with respect to FIGS. 5A, 5B, 9, and elsewhere herein.

In some embodiments, the seal member 1740 may be formed of alumina or other similar material having a low permeability and subsequent release of metal ions relative to other materials currently used in platinum resistance temperature sensor applications. The seal member 1740 may have a size and shape corresponding to the size and shape of the sidewalls 1732 such that the seal member 1740 may be snuggly positioned within the cavity 1730 at the open first end 1734. The seal member 1740 may have apertures 1742 extending therethrough to permit the first terminal 1724 and the second terminal 1726 to extend from the cavity 1730 to an exterior of the platinum resistance temperature sensor 1700. The seal member 1740 may be attached (e.g., via adhesive) to the sidewalls 1732 or the first end 1708 to secure the main body 1702 and platinum member 1714 in the cavity 1730. An adhesive material may also be included at the junction of the apertures 1742 and the first end second terminals 1724 and 1726 to facilitate sealing the main body 1702 and platinum member 1714 in the cavity 1730.

The platinum member 1714 is spaced apart from the peripheral surface 1704 and suspended over the peripheral surface 1704 by a set of support structures of the plurality of support structures. The platinum member 1714 extends through apertures in the set of support structures. The platinum member 1714 may also be spaced apart from the sidewalls 1732 by the set of support structures. Spacing the platinum member 1714 apart from the main body 1702 and the sleeve 1728 allows for deflection of the platinum member 1714 as described elsewhere herein. Moreover, a distance at which the plurality of support structures are spaced apart in a direction parallel to the axis 1706 may be selected to achieve the desired level of support for the platinum member 1714.

The circular cross-section of the main body 1702 in this embodiment is symmetrical (e.g., a dimension of the cross-section along a first axis is equal to a dimension of the cross-section along second axis orthogonal to the first axis); however, in other embodiments, the circular cross-section may be asymmetrical (e.g., a dimension of the cross-section along the first axis is unequal to a dimension of the cross-section along a second axis that is orthogonal to the first axis). In some embodiments, the main body 1702 may have a cross-section with a different shape. For instance, the main body 1702 may have a rectangular shape and the plurality of support structures 1712 may be peripherally arranged on two or more sides of peripheral surface 1704. Other cross-sectional shapes of the main body 1702, such as triangular, are considered as being within the scope of the disclosure. The cavity 1730 may have a shape corresponding to the shape of the main body 1702.

In some embodiments, the platinum member 1714 may be laterally supported by the support structures 1712 without the support structures 1712 suspending the platinum member 1714. For instance, the first length 1714a of the platinum member 1714 may be laterally supported by first sides of the first set of support structures 1718, may have the second length 1714b extending as shown around adjacent support structures, and have the third length 1714c extending back to the first end 1708 and being laterally supported by second sides of the second set of support structures 1720 opposite to the first side. The platinum member 1714 may be loosely supported in a radial direction of the main body 1702 by the peripheral surface 1704 of the main body 1702 and the sidewalls 1732. In such embodiments, the platinum member 1714 may not extend through apertures in the support structures 1712, as described below with respect to FIGS. 20A, 20B, and 20C.

Figure 19:
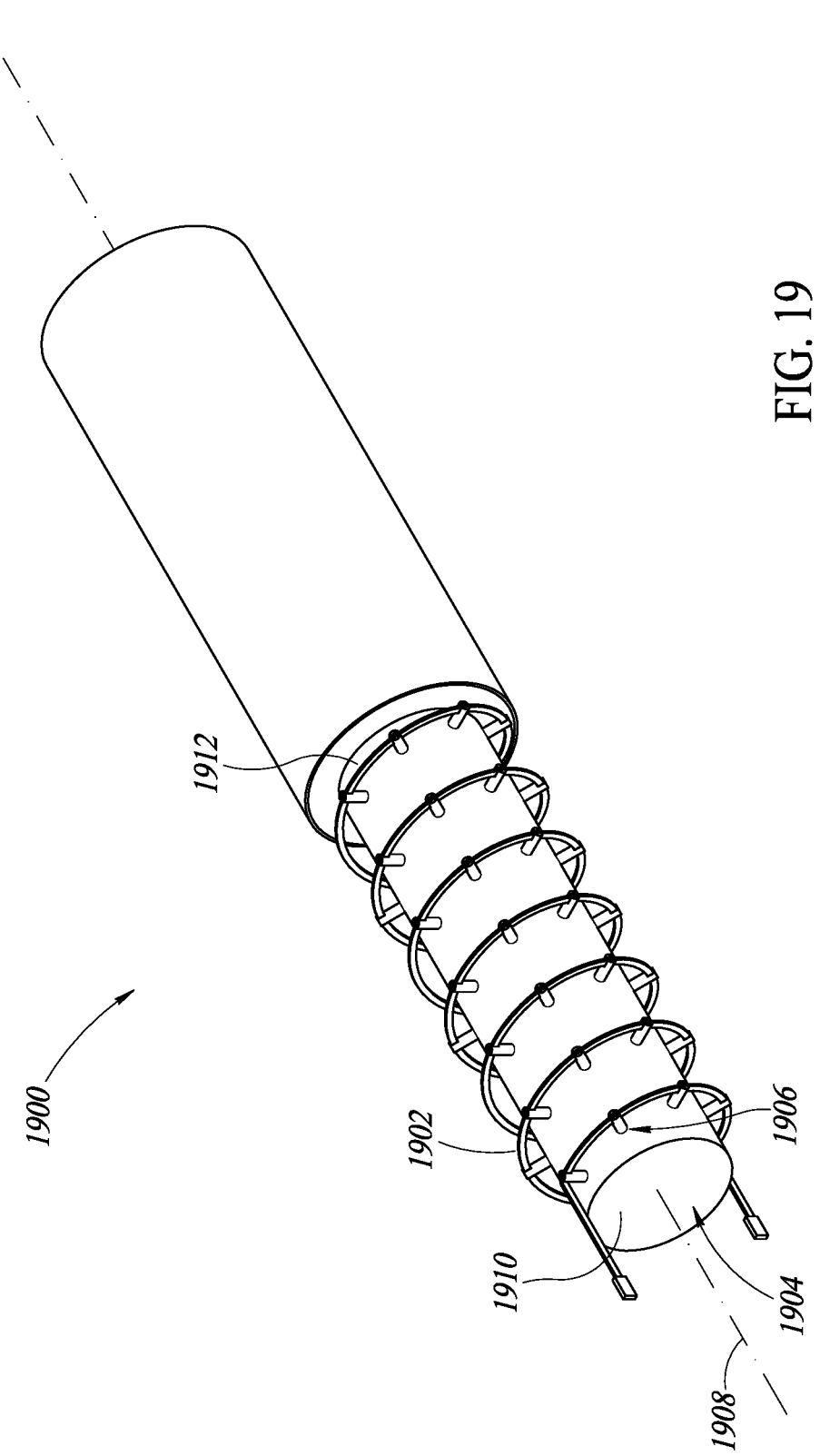
FIG. 19 shows a partially-exploded view of a platinum resistance temperature sensor having a helically wound platinum member according to one or more embodiments.

FIG. 19 shows a platinum resistance temperature sensor 1900 having a helically wound platinum member 1902. The platinum resistance temperature sensor 1900 has a main body 1904 with a plurality of support structures 1906 projecting outwardly therefrom as described with respect to the platinum resistance temperature sensor 1700. The platinum member 1902 of the platinum resistance temperature sensor 1900 is wrapped concentrically around an axis 1908 extending through a center of the main body 1904. The platinum member 1902 is supported by a set of the plurality of support structures 1906 as described above with respect to the platinum resistance temperature sensor 1700. The platinum member 1902 is helically wound around the main body 1904. In particular, the platinum member 1902 winds both concentrically around the main body 1904 and along a length of the main body 1904 to form a helically wound shape. The plurality of support structures 1906 may be staggered or asymmetrically arranged along the length of the main body 1904 in correspondence with a desired helically wound shape of the platinum member 1902.

In some embodiments, the platinum member 1902 helically winds from a first end 1910 of the main body 1904 to a second end 1912 of the main body through a first set of support structures of the plurality of support structures 1906. Then, the platinum member 1902 helically winds from the second end 1912 through a second set of support structures of the plurality of support structures 1906 back to the first end 1910. The first set of support structures may be offset, radially and/or longitudinally, from the second set of support structures to facilitate helical winding back and forth along the length of the main body 1904. In some embodiments, the platinum member 1902 helically winds from a first end 1910 of the main body 1904 to a second end 1912 of the main body through a first set of support structures of the plurality of support structures 1906. Then, the platinum member 1902 linearly extends back from the second end 1912 to the first end 1910.

The platinum resistance temperature sensor 1900 is substantially similar to the platinum resistance temperature sensor 1700 in at least some other respects, so further description thereof is omitted for brevity.

In some embodiments, the platinum member 1902 may be wound around the main body 1904 between the support structures 1906. For instance, the platinum member 1902 may be helically wound around the main body 1904 in between the support structures 1906, which support the platinum member 1902 by limiting its movement in the longitudinal direction (i.e., in a direction along the axis 1908). Movement of the platinum member 1902 in a radial direction of the main body 1904 (i.e., in directions orthogonal to the axis 1908) may be restricted by the peripheral surface of the main body and the surface of the sidewalls 1732 of the sleeve 1728 (see FIG. 17). For instance, the platinum member 1902 may be loosely constrained between the peripheral surface of the main body 1904 and the sidewalls 1732, which prevent the platinum member 1902 from moving more than a height of the support structures 1906 in a radial direction of the main body 1904. In some embodiments, support platforms may extend between adjacent ones of the support structures 1906 in the longitudinal direction, which support and suspend the platinum member 1902 over the main body 1904. In some embodiments, the platinum member 1902 may be woven back and forth between the support structures 1906 along the helical path shown in FIG. 19.

Figure 20A:
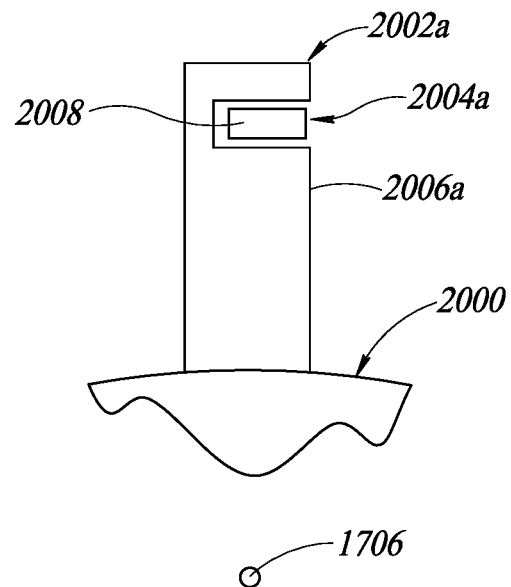
FIG. 20A shows a side view of a support structure of a platinum resistance temperature sensor having a platinum member positioned in an aperture in a side of the support structure.
Figures 20B, 20C:
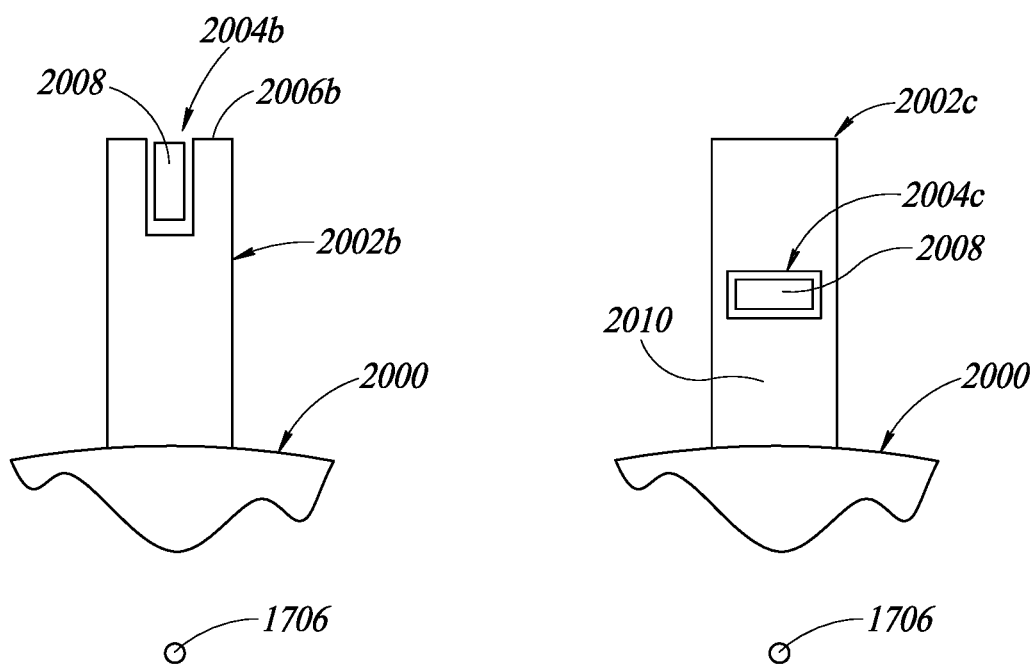
FIG. 20B shows a side view of a support structure of a platinum resistance temperature sensor having a platinum member positioned in an aperture in an end of the support structure.
FIG. 20C shows a side view of a support structure of a platinum resistance temperature sensor having a platinum member positioned in an aperture in a medial portion of the support structure.

Some or all of the plurality of support structures may include apertures through which the platinum member may extend for support. As shown in FIG. 20A, FIG. 20B, and FIG. 20C, the apertures in the support structures may have different orientations and/or positions in the support structures.

FIG. 20A shows a support structure 2002a projecting from a peripheral surface 2000 of a main body that extends along the axis 1706 according to one or more embodiments. The support structure 2002a has an aperture 2004a, appearing as a notch, on a side 2006a of the support structure 2002a. The aperture 2004a has a recessed shape with an opening at the side 2006a for receiving and supporting a platinum member 2008 in the support structure 2002a. The aperture 2004a is sized and shaped according to the cross-sectional size and shape of the platinum member 2008 such that the platinum member 2008 snuggly fits within the aperture 2004a. For instance, the aperture 2004a is sized and shaped for receiving a horizontally oriented cross section of the platinum member 2008.

FIG. 20B shows a support structure 2002b projecting from the peripheral surface 2000 of a main body that extends along the axis 1706 according to one or more embodiments. The support structure 2002b has an aperture 2004b, appearing as a notch, on an end portion 2006b of the support structure 2002b that is distal to the peripheral surface 2000. The aperture 2004b has a recessed shape with an opening at the end portion 2006b for receiving and supporting the platinum member 2008 in the support structure 2002b. The aperture 2004b is sized and shaped according to the cross-sectional size and shape of the platinum member 2008 such that the platinum member 2008 snuggly fits within the aperture 2004b. For instance, the aperture 2004 is sized and shaped for receiving a vertically oriented cross section of the platinum member 2008.

FIG. 20C shows a support structure 2002c projecting from the peripheral surface 2000 of a main body that extends along the axis 1706 according to one or more embodiments. The support structure 2002c has an aperture 2004c, appearing as a hole, extending through a medial portion of the support structure 2002b. The aperture 2004c extends through the support structure 2002c from a first side 2010 of the support structure 2002c to a second side (not shown) of the support structure 2002b in a direction along or parallel to the axis 1706. The aperture 2004c is sized and shaped according to the cross-sectional size and shape of the platinum member 2008 such that the platinum member 2008 snuggly fits within the aperture 2004c. The size, shape, position, and/or orientation of the apertures 2004a, 2004b, and 2004c are non-limiting examples of the myriad ways in which a platinum member may be supported by a support structure. Other configurations for supporting the platinum member with the support structure are considered as being within the scope of the present disclosure.

Figure 21:
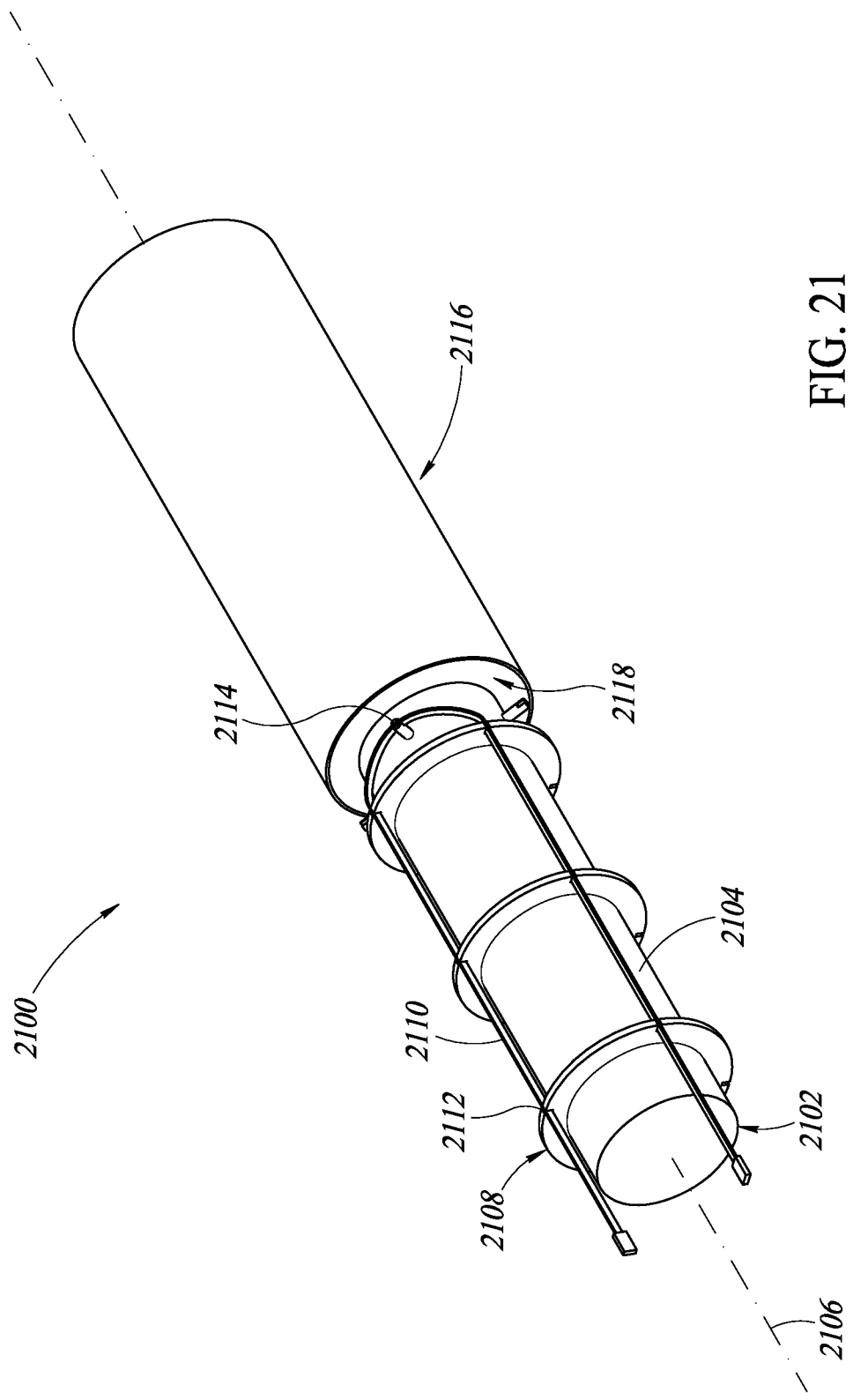
FIG. 21 shows a partially-exploded view of a platinum resistance temperature sensor having a plurality of support structures extending around a periphery of a main body of the platinum resistance temperature sensor.

FIG. 21 shows a partially-exploded view of a platinum resistance temperature sensor 2100 according to one or more embodiments. The platinum resistance temperature sensor 2100 has a main body 2102 having a peripheral surface 2104 extending along an axis 2106 to define a length of the body between opposite ends of the main body 2102. The platinum resistance temperature sensor 2100 also includes a set of support structures 2108 arranged along a length of the main body 2102. A platinum member 2110, as described herein, is supported by the set of support structures 2108 such that the platinum member 2110 is suspended over the peripheral surface 2104.

In this embodiment, the set of support structures 2108 is comprised of a plurality of ridges that each project radially outward from the peripheral surface 2104 and extend about the axis 2106. The set of support structures 2108 are spaced apart from each other along the main body 2102 in a direction along the axis 2106. The plurality of ridges depicted in FIG. 21 are annular rings located at different points along the length of the main body 2102 and which are continuous along their circumference. In some embodiments, each annular ring may be formed by a plurality of ridge portions spaced apart from each other around the peripheral surface 2104 such that each support structure is formed by a discontinuous set of structures.

Each of the set of support structures 2108 has a set of apertures 2112 for receiving and supporting the platinum member 2110 in the support structures 2108. The set of apertures 2112 may be notches or holes in the support structures 2108 similar to those described with respect to FIGS. 20A, 20B, and/or 20C. The set of apertures 2112 may be located at different angular positions around each support structure 2108 to receive and support a corresponding portion of the platinum member 2110.

The platinum member 2110 extends from a first end of the main body 2102, toward a second end of the main body 2102, and through an aperture of the set of apertures 2112 of each support structure 2108. The platinum member 2110 may then wind through a different aperture of the set of apertures 2112 of each support structure 2108 and back toward the first end of the main body 2102. The main body 2102 may include a feature 2114, such as a pole or post, located toward the second end of the main body 2102 around which the platinum member 2110 may bend to return to the first end of the main body 2102.

The platinum resistance temperature sensor 2100 also includes a sleeve 2116 having a cavity 2118 formed therein for receiving the main body 2102 with the wound platinum member 2110. The cavity 2118 may have a size and a shape corresponding to a spacing between sidewalls that define the cavity 2118. As a result, the peripheral surface 2104 of the main body 2102 is spaced apart from the sidewalls at a distance equal to the peripheral width (e.g., circumferential thickness) of the set of support structures 2108. Thus, the platinum member 2110 is spaced apart from the peripheral surface 2104 and the main body 2102 is maintained in a fixed relationship with respect to the sleeve 2116. Other aspects of the platinum resistance temperature sensor 2100 are substantially similar to the platinum resistance temperature sensor 1700 and/or 1900 so further description thereof is omitted for brevity.

In some embodiments, the set of support structures 2108 may include a single ridge that helically winds around a length the main body 2102. The platinum member 2110 may be supported at positions along the helically winding ridge.

The foregoing embodiments of a platinum resistance temperature sensor include features that provide improved accuracy and that are robust to impact and/or vibration. Embodiments described herein may have a relatively lower cost of construction and maintenance than the wire-wound platinum resistance temperature sensor 100, could be used in high-end equipment and environments in which accuracy of temperature measurements is important, and in locations and settings where there may be long periods of time between calibrations.

The various embodiments described above can be combined to provide further embodiments. One or more features of platinum resistance temperature sensors described and depicted with respect to the Figures may be modified in view of or combined with features of other platinum resistance temperature sensors.

For instance, a temperature sensor may comprise a platinum member having a base portion and a plurality of prongs, the plurality of prongs extending in a first direction from the base portion, a first prong of the plurality of prongs having an end portion, and each of the plurality of prongs having a medial portion; and a housing having interior sidewalls, an interior upper surface, and an interior lower surface collectively defining a sealed cavity housing the platinum member, the housing including: a first platform projecting in a second direction from the interior lower surface and having a first support surface that supports the base portion, the second direction being transverse to the first direction, and a second platform projecting in the second direction from the interior lower surface and having a second support surface that supports the end portion, the first support surface being spaced apart from the second support surface along the first direction, and the medial portions being spaced apart from the interior lower surface.

The housing of the foregoing temperature sensor may be formed of alumina ($Al_2O_3$). The platinum member may have a width along a third direction transverse to the first direction and the second direction, a length along the first direction that is greater than the width, and a thickness along the second direction that is less than the width. The base portion of the platinum member may be adhesively attached to the first support surface using a material having a coefficient of thermal expansion similar to platinum.

The foregoing temperature sensor may further comprise a barrier layer coating the platinum member, the barrier layer being of a material having a coefficient of thermal expansion similar to platinum. In some cases, a second prong of the plurality of prongs may have an end portion that is supported by the second support surface.

The foregoing temperature sensor may further comprise a first wire attached to the end portion of the first prong, and a second wire attached to the end portion of the second prong, wherein the first wire and the second wire extend through the housing to an exterior of the temperature sensing device. The first wire may be attached to the end portion of the first prong via a first platinum pad and the second wire may be attached to the end portion of the second prong via a second platinum pad.

In some cases, the housing of the foregoing temperature sensor may include a first substrate and a second substrate, and the temperature sensor further comprises a seal surrounding a perimeter of the sealed cavity and attaching the first substrate and the second substrate to each other.

In some cases, the base portion of the platinum member includes a receiving portion defined by sidewalls extending in the second direction from an aperture on a surface of the base portion, and the first platform includes a first post extending in the second direction from the first support surface and being received within the receiving portion, wherein sidewalls of the receiving portion are spaced apart from sides of the first post.

In some cases, the platinum member may include a second base portion, wherein the first platform includes a first post extending in the second direction from the first support surface and spaced apart from surfaces of the base portion, the second platform includes a second post extending in the second direction from the second support surface, and the first post and the second post restrict displacement of the platinum member along a plane parallel to the first direction.

In some cases, a first portion of the interior upper surface is spaced apart from the base portion at a first distance less than a thickness of the base portion, and a second portion of the interior upper surface is spaced apart from the end portion at a second distance less than a thickness of the end portion. The housing of the temperature sensor may further include a member projecting from an interior surface of the housing adjacent to the medial portion of the first prong, the member being spaced apart from the first platform and the second platform along the first direction to restrict bending of the first prong in a direction transverse to the first direction. In some cases, a section of the base portion is suspended over and spaced apart from the interior lower surface.

Changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature sensor, comprising:
   a main body having a peripheral surface extending along an axis between ends of the main body;
   a plurality of support structures arranged along the main body and projecting from the peripheral surface of the main body transversely to the axis;
   a sleeve having a cavity defined by one or more sidewalls extending between a first end and a second end, wherein the main body is positioned within the cavity; and
   a platinum member spaced apart from the peripheral surface of the main body and supported by a set of support structures of the plurality of support structures, wherein the platinum member has a length that extends along the main body.

2. The temperature sensor of claim 1, further comprising:
   a seal member extending between the one or more sidewalls at the first end of the sleeve and sealing the main body and the platinum member within the cavity; and
   measurement terminals connected to ends of the platinum member within the cavity, wherein the measurement terminals extend through the seal member to an exterior of the temperature sensor.

3. The temperature sensor of claim 1, wherein the main body has a cylindrical shape and the plurality of support structures are circumferentially arranged on the main body.

4. The temperature sensor of claim 1, wherein the main body has a rectangular shape and the plurality of support structures are peripherally arranged on two or more sides of the main body.

5. The temperature sensor of claim 1, wherein the plurality of support structures are sized to support the main body in a suspended state in which the peripheral surface of the main body is spaced apart from the one or more sidewalls of the sleeve.

6. The temperature sensor of claim 1, wherein the plurality of support structures are spaced apart from each other along a length of the main body.

7. The temperature sensor of claim 1, wherein the set of support structures includes a set of elongated members that extend in directions transverse to the axis along a length of the main body.

8. The temperature sensor of claim 1, wherein the set of support structures includes a set of ridges projecting outwardly from the peripheral surface of the main body and spaced apart from each other along the main body.

9. The temperature sensor of claim 1, wherein the platinum member extends through a hole defined in each support structure of the set of support structures, the hole being spaced apart from the peripheral surface of the main body.

10. The temperature sensor of claim 1, wherein the platinum member is a length of platinum wire.

11. The temperature sensor of claim 1, wherein the platinum member is a length of platinum foil.

12. The temperature sensor of claim 1, wherein a length of the platinum member is secured to the set of support structures and the length of the platinum member winds back and forth along the main body between the ends of the main body.

13. The temperature sensor of claim 1, wherein a length of the platinum member is secured to the set of support structures and is helically wound around the axis of the main body.

14. The temperature sensor of claim 1, wherein the main body and the sleeve are formed of alumina.

15. The temperature sensor of claim 1, wherein the set of support structures suspend the platinum member over the peripheral surface of the main body.

16. The temperature sensor of claim 1, wherein the platinum member is bent around one or more support structures of the set of support structures.

17. The temperature sensor of claim 1, wherein the plurality of support structures are symmetrically arranged on the peripheral surface of the main body.

18. The temperature sensor of claim 1, wherein the support structures of the set of support structures suspend the platinum member between the peripheral surface of the main body and the one or more sidewalls of the sleeve.

19. The temperature sensor of claim 1, wherein the platinum member extends through a notch defined in each support structure of the set of support structures, the notch being spaced apart from the peripheral surface of the main body.

20. The temperature sensor of claim 1, wherein the set of support structures are arranged in two or more ring formations around the main body, and support structures of adjacent ring formations are radially offset from each other around the axis of the main body.

* * * * *